US010552565B2

(12) United States Patent
Anikin et al.

(10) Patent No.: US 10,552,565 B2
(45) Date of Patent: *Feb. 4, 2020

(54) SIMULTANEOUS MULTI-LAYER FILL GENERATION

(71) Applicant: Mentor Graphics Corporation, Wilsonville, OR (US)

(72) Inventors: Eugene Anikin, West Linn, OR (US); Fedor G. Pikus, Beaverton, OR (US); Laurence Grodd, Portland, OR (US); David A. Abercrombie, Apex, NC (US); John W. Stedman, Beaverton, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,595

(22) Filed: Nov. 22, 2016

(65) Prior Publication Data

US 2017/0147732 A1 May 25, 2017

Related U.S. Application Data

(63) Continuation of application No. 13/093,828, filed on Apr. 25, 2011, now Pat. No. 9,652,574, which is a
(Continued)

(51) Int. Cl.
*G06F 17/50* (2006.01)
*G03F 1/44* (2012.01)
*H01L 27/02* (2006.01)

(52) U.S. Cl.
CPC ...... *G06F 17/5072* (2013.01); *G06F 17/5068* (2013.01); *G03F 1/44* (2013.01);
(Continued)

(58) Field of Classification Search
CPC ............ G06F 17/5068; G06F 2217/12; G06F 17/5072; G06F 21/14; G06F 17/5077;
(Continued)

(56) References Cited

U.S. PATENT DOCUMENTS 4,576,900 A * 3/1986 Chiang ............. H01L 21/76801
257/758
5,885,856 A * 3/1999 Gilbert ............. H01L 21/31053
257/E21.244

(Continued)

*Primary Examiner* — Helen Rossoshek

(57) ABSTRACT

Techniques are disclosed for optimizing the pattern density in the circuit layout design of a circuit layer. A layer in circuit design is analyzed to define empty regions that can be filled with fill polygons (referred to hereafter as "fill" regions). Next, a pattern of fill polygons is generated. After the fill polygons have been defined, the layout design for the layer is divided into separate areas or "windows," and a target density for each window is determined. Once this target density for the window has been determined, the fill polygons required to most closely approach this target density are generated and added to the circuit layout design. This process may be repeated with progressively different (e.g., smaller) fill polygons, until each window meets or exceeds both the specified minimum density and complies with the specified maximum density gradient. Additionally, some implementations may allow a user to simultaneously optimize the density of multiple layers of a circuit by adding fill polygons to multiple layers of a circuit design simultaneously. Representations of sections of a multilayer fill structure will then be added to corresponding layers the circuit design until a specified target density is met.

20 Claims, 19 Drawing Sheets

Related U.S. Application Data continuation of application No. 12/121,135, filed on May 15, 2008, now abandoned, and application No. 13/093,828, which is a continuation-in-part of application No. 11/743,116, filed on May 1, 2007, now abandoned, which is a continuation-in-part of application No. 60/853,309, filed on May 1, 2006.

(60) Provisional application No. 60/930,596, filed on May 16, 2007, provisional application No. 61/039,100, filed on Mar. 24, 2008.

(52) U.S. Cl.
CPC ...... *G06F 17/5045* (2013.01); *G06F 2217/12* (2013.01); *H01L 27/0207* (2013.01); *Y02P 90/265* (2015.11)

(58) Field of Classification Search
CPC ........ G06F 17/5045; G03F 1/144; G03F 1/36; G03F 7/70633; G03F 7/70433; H01L 27/0207; H01L 2924/14; H01L 23/528
See application file for complete search history.

(56) References Cited

U.S. PATENT DOCUMENTS

| | | | | |
|---|---|---|---|---|
| 5,984,510 A * | 11/1999 | Guruswamy | ....... | G06F 17/5068 716/104 |
| 6,209,123 B1 * | 3/2001 | Maziasz | ............ | G06F 17/5068 716/123 |
| 6,217,721 B1 * | 4/2001 | Xu | ..................... | C23C 14/0036 204/192.15 |
| 6,680,539 B2 * | 1/2004 | Nohsoh | ................ | H01L 23/528 257/758 |
| 7,017,141 B2 * | 3/2006 | Anderson | ........... | G06F 17/5081 716/52 |
| 7,124,386 B2 * | 10/2006 | Smith | ................. | G06F 17/5068 716/51 |
| 7,231,624 B2 * | 6/2007 | Vuong | ................ | G06F 17/5077 716/122 |
| 7,328,419 B2 * | 2/2008 | Vuong | ................ | G06F 17/5068 716/112 |
| 7,343,580 B2 * | 3/2008 | Zorrilla | ............... | G06F 17/5036 716/112 |
| 7,565,638 B2 * | 7/2009 | Hoerold | ............. | G06F 17/5068 716/106 |
| 7,607,112 B2 * | 10/2009 | Leung | ................ | H01L 27/0207 716/100 |
| 7,829,357 B2 * | 11/2010 | Grillberger | ............. | H01L 22/34 438/18 |
| 7,865,858 B2 * | 1/2011 | Vuong | ................ | G06F 17/5077 716/126 |
| 7,966,594 B2 * | 6/2011 | Zorrilla | ............... | G06F 17/5036 716/110 |
| 8,161,425 B1 * | 4/2012 | Noice | ................... | H01L 23/522 430/30 |
| 8,327,300 B2 * | 12/2012 | Vuong | ................ | G06F 17/5068 716/112 |
| 2004/0098674 A1 * | 5/2004 | Vuong | ................ | G06F 17/5068 716/113 |
| 2004/0098688 A1 * | 5/2004 | Vuong | ................ | G06F 17/5068 257/773 |
| 2005/0044520 A1 * | 2/2005 | Vuong | ................ | G06F 17/5077 716/122 |
| 2007/0234265 A1 * | 10/2007 | Vuong | ................ | G06F 17/5077 716/54 |
| 2008/0034332 A1 * | 2/2008 | Anikin | ................ | G06F 17/5068 716/54 |
| 2008/0148212 A1 * | 6/2008 | Vuong | ................ | G06F 17/5068 716/112 |
| 2010/0155956 A1 * | 6/2010 | Werkheiser | ....... | H01L 21/76819 257/773 |
| 2011/0042818 A1 * | 2/2011 | Liao | ...................... | H01L 23/522 257/773 |
| 2013/0119508 A1 * | 5/2013 | Camillo-Castillo | ........................ | H01L 29/66234 257/517 |
| 2014/0317581 A1 * | 10/2014 | Chuang | ............... | H01L 21/0274 716/53 |

* cited by examiner

| 801A | 801B | 801C | 801D | 801E |
|---|---|---|---|---|
| 9 | 40 | 50 | 55 | 12 |
| 801F | 801G | 801H | 801I | 801J |
| 10 | 24 | 66 | 26 | 57 |
| 801K | 801L | 801M | 801N | 801O |
| 30 | 23 | 12 | 13 | 33 |
| 801P | 801Q | 801R | 801S | 801T |
| 69 | 12 | 40 | 16 | 20 |
| 801U | 801V | 801W | 801X | 801Y |
| 12 | 35 | 51 | 18 | 43 |

FIG. 9A

| 801A | 801B | 801C | 801D | 801E |
|---|---|---|---|---|
| 9 \| 45 | 40 \| 55 | 50 \| 51 | 55 \| 66 | 12 \| 14 |
| 801F | 801G | 801H | 801I | 801J |
| 10 \| 43 | 24 \| 29 | 66 \| 66 | 26 \| 33 | 57 \| 60 |
| 801K | 801L | 801M | 801N | 801O |
| 30 \| 50 | 23 \| 39 | 12 \| 16 | 13 \| 21 | 33 \| 40 |
| 801P | 801Q | 801R | 801S | 801T |
| 69 \| 72 | 12 \| 31 | 40 \| 52 | 16 \| 30 | 20 \| 37 |
| 801U | 801V | 801W | 801X | 801Y |
| 12 \| 35 | 35 \| 39 | 51 \| 51 | 18 \| 50 | 43 \| 49 |

FIG. 9B

| 801A | | 801B | | 801C | | 801D | | 801E | |
|---|---|---|---|---|---|---|---|---|---|
| 20 | 45 | 40 | 55 | 50 | 51 | 55 | 66 | 14 | 14 |
| 801F | | 801G | | 801H | | 801I | | 801J | |
| 20 | 43 | 24 | 29 | 66 | 66 | 26 | 33 | 57 | 60 |
| 801K | | 801L | | 801M | | 801N | | 801O | |
| 30 | 50 | 23 | 39 | 16 | 16 | 20 | 21 | 33 | 40 |
| 801P | | 801Q | | 801R | | 801S | | 801T | |
| 69 | 72 | 20 | 31 | 40 | 52 | 20 | 30 | 20 | 37 |
| 801U | | 801V | | 801W | | 801X | | 801Y | |
| 20 | 35 | 35 | 39 | 51 | 51 | 20 | 50 | 43 | 49 |

FIG. 9C

| 801A | | 801B | | 801C | | 801D | | 801E | |
|---|---|---|---|---|---|---|---|---|---|
| 20 | 45 | 40 | 55 | 50 | 51 | 55 | 66 | 14 | 14 |
| 20 | | -20 | | 16 | | -41 | | 43 | |
| 801F | | 801G | | 801H | | 801I | | 801J | |
| 20 | 43 | 24 | 29 | 66 | 66 | 26 | 33 | 57 | 60 |
| 10 | | 42 | | -50 | | 40 | | -43 | |
| 801K | | 801L | | 801M | | 801N | | 801O | |
| 30 | 50 | 23 | 39 | 16 | 16 | 20 | 21 | 33 | 40 |
| 39 | | -7 | | 50 | | 13 | | 24 | |
| 801P | | 801Q | | 801R | | 801S | | 801T | |
| 69 | 72 | 20 | 31 | 40 | 52 | 20 | 30 | 20 | 37 |
| -49 | | 49 | | -24 | | 20 | | 23 | |
| 801U | | 801V | | 801W | | 801X | | 801Y | |
| 20 | 35 | 35 | 39 | 51 | 51 | 20 | 50 | 43 | 49 |
| 49 | | 16 | | -31 | | 31 | | -23 | |

FIG. 9D

| 801A | | 801B | | 801C | | 801D | | 801E | |
|---|---|---|---|---|---|---|---|---|---|
| 20 | 45 | 40 | 55 | 50 | 51 | 55 | 66 | 14 | 14 |
| 20 |  | -20 | 8 | 16 | 6 | -41 | 4 | 43 |  |
| 801F | | 801G | | 801H | | 801I | | 801J | |
| 20 | 43 | 24 | 29 | 66 | 66 | 26 | 33 | 57 | 60 |
| 10 |  | 42 |  | -50 | 2 | 40 |  | -43 | 3 |
| 801K | | 801L | | 801M | | 801N | | 801O | |
| 30 | 50 | 23 | 39 | 16 | 16 | 20 | 21 | 33 | 40 |
| 39 |  | -7 |  | 50 |  | 13 |  | 24 |  |
| 801P | | 801Q | | 801R | | 801S | | 801T | |
| 69 | 72 | 20 | 31 | 40 | 52 | 20 | 30 | 20 | 37 |
| -49 | 1 | 49 |  | -24 | 9 | 20 |  | 23 |  |
| 801U | | 801V | | 801W | | 801X | | 801Y | |
| 20 | 35 | 35 | 39 | 51 | 51 | 20 | 50 | 43 | 49 |
| 49 |  | 16 | 10 | -31 | 5 | 31 |  | -23 | 7 |

FIG. 9E

| 801A | | 801B | | 801C | | 801D | | 801E | |
|---|---|---|---|---|---|---|---|---|---|
| 20 | 45 | 40 | 55 | 50 | 51 | 55 | 66 | 14 | 14 |
| 20 | | -20 | | 16 | | -41 | 4 | 43 | |
| 801F | | 801G | | 801H | | 801I | | 801J | |
| 20 | 43 | 24 | 29 | 66 | 66 | 26 | 33 | 57 | 60 |
| 10 | | 42 | | -50 | 1 | 40 | | -43 | 3 |
| 801K | | 801L | | 801M | | 801N | | 801O | |
| 30 | 50 | 23 | 39 | 16 | 16 | 20 | 21 | 33 | 40 |
| 39 | | -7 | | 50 | | 13 | | 24 | |
| 801P | | 801Q | | 801R | | 801S | | 801T | |
| 69 | 72 | 20 | 31 | 40 | 52 | 20 | 30 | 20 | 37 |
| -49 | 2 | 49 | | -24 | | 20 | | 23 | |
| 801U | | 801V | | 801W | | 801X | | 801Y | |
| 20 | 35 | 35 | 39 | 51 | 51 | 20 | 50 | 43 | 49 |
| 49 | | 16 | | -31 | | 31 | | -23 | |

FIG. 9F

| 801A | | 801B | | 801C | | 801D | | 801E | |
|---|---|---|---|---|---|---|---|---|---|
| 20 | 45 | 40 | 55 | 50 | 51 | 55 | 66 | 14 | 14 |
| 20 | | -20 | | 16 | | -41 | 4 | 43 | |
| 801F | | 801G | | 801H | | 801I | | 801J | |
| 20 | 43 | 26 | 29 | 66 | 66 | 26 | 33 | 57 | 60 |
| 10 | | 40 | | -50 | 1 | 40 | | -43 | 3 |
| 801K | | 801L | | 801M | | 801N | | 801O | |
| 30 | 50 | 23 | 39 | 16 | 16 | 20 | 21 | 33 | 40 |
| 39 | | -7 | | 50 | | 13 | | 24 | |
| 801P | | 801Q | | 801R | | 801S | | 801T | |
| 69 | 72 | 20 | 31 | 40 | 52 | 20 | 30 | 20 | 37 |
| -49 | 2 | 49 | | -24 | | 20 | | 23 | |
| 801U | | 801V | | 801W | | 801X | | 801Y | |
| 20 | 35 | 35 | 39 | 51 | 51 | 20 | 50 | 43 | 49 |
| 49 | | 16 | | -31 | | 31 | | -23 | |

FIG. 9G

| 801A | | 801B | | 801C | | 801D | | 801E | |
|---|---|---|---|---|---|---|---|---|---|
| 20 | 45 | 40 | 55 | 50 | 51 | 55 | 66 | 14 | 14 |
| 20 | | -20 | | 16 | | -41 | 4 | 43 | |
| 801F | | 801G | | 801H | | 801I | | 801J | |
| 20 | 43 | 26 | 29 | 66 | 66 | 26 | 33 | 57 | 60 |
| 10 | | 40 | | -50 | 1 | 40 | | -43 | 3 |
| 801K | | 801L | | 801M | | 801N | | 801O | |
| 30 | 50 | 23 | 39 | 16 | 16 | 20 | 21 | 33 | 40 |
| 39 | | -7 | | 50 | | 13 | | 24 | |
| 801P | | 801Q | | 801R | | 801S | | 801T | |
| 69 | 72 | 29 | 31 | 40 | 52 | 20 | 30 | 20 | 37 |
| -40 | 2 | 40 | | -24 | | 20 | | 23 | |
| 801U | | 801V | | 801W | | 801X | | 801Y | |
| 29 | 35 | 35 | 39 | 51 | 51 | 20 | 50 | 43 | 49 |
| 40 | | 16 | | -31 | | 31 | | -23 | |

FIG. 9H

SIMULTANEOUS MULTI-LAYER FILL GENERATION

RELATED APPLICATIONS

This application is a continuation of U.S. patent application Ser. No. 13/093,828, entitled "Simultaneous Multi-Layer Fill Generation," filed on Apr. 25, 2011, and naming Eugene Anikin et al. as inventors, which application in turn was: (1) a continuation of U.S. patent application Ser. No. 12/121,135, entitled "Simultaneous Multi-Layer Fill Generation," filed on May 15, 2008, and naming Eugene Anikin et al. as inventors, which application in turn claims priority under 35 U.S.C. § 119 to U.S. Provisional Patent Application No. 60/930,596 entitled "Simultaneous Multi-Layer Fill Generation," filed on May 16, 2007, naming Eugene Anikin et al. as inventor, and to U.S. Provisional Patent Application No. 61/039,100 entitled "Simultaneous Multi-Layer Fill Generation," filed on Mar. 24, 2008, naming Eugene Anikin et al. as inventor, each of which applications are incorporated entirely herein by reference; and (2) is a continuation-in-part of U.S. patent application Ser. No. 11/743,116, entitled "Optimization Of Pattern Density," filed on May 1, 2007, naming Eugene Anikin as inventor, which in turn claims priority under 35 U.S.C. § 119 to U.S. Provisional Patent Application No. 60/853,309 entitled "Optimization Of Pattern Density," filed on May 1, 2006, naming Eugene Anikin as inventor, and originally assigned U.S. patent application Ser. No. 11/415,878, each of which applications are incorporated entirely herein by reference as well.

FIELD OF THE INVENTION

The present invention relates to various techniques and tools to assist in the design of circuits, such as integrated circuits. Various aspects of the present invention are particularly applicable to optimizing the densities of structures in multiple layers of a circuit.

BACKGROUND OF THE INVENTION

Electronic circuits, such as integrated microcircuits, are used in a variety of products, from automobiles to microwaves to personal computers. Designing and fabricating microcircuit devices typically involve many steps, known as a "design flow." The particular steps of a design flow are highly dependent upon the type of microcircuit being designed, its complexity, the design team, and the microcircuit fabricator or foundry that will manufacture the microcircuit. Typically, software and hardware "tools" will verify a design at various stages of the design flow by running software simulators and/or hardware emulators, and errors in the design are corrected.

Several steps are common to most design flows. Initially, the specification for the new microcircuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logical of the circuit is then analyzed, to confirm that the logic incorporated into the design will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This logical generally corresponds to the level of representation displayed in conventional circuit diagrams. Preliminary timing estimates for portions of the circuit may be made at this stage, using an assumed characteristic speed for each device. In addition, the relationships between the electronic devices are analyzed, to confirm that the circuit described by the device design will correctly perform the functions desired for the circuit. This analysis is sometimes referred to as "formal verification."

Once the relationships between circuit devices have been established, the design is again transformed, this time into a physical design that describes specific geometric elements. This type of design often is referred to as a "layout" design. The geometric elements define the shapes that will be created in various materials to actually manufacture the circuit device components (e.g., contacts, gates, etc.) making up the circuit. While the geometric elements are typically polygons (and are often colloquially referred to as "polygons"), other shapes, such as circular and elliptical shapes, also may be employed. These geometric elements may be custom designed, selected from a library of previously-created designs, or some combination of both. Geometric elements also are added to form the connection lines that will interconnect these circuit devices. Layout tools (often referred to as "place and route" tools), such as Mentor Graphics' IC Station or Cadence's Virtuoso, are commonly used for both of these tasks.

With a layout design, each physical layer of the microcircuit will have a corresponding layer representation, and the geometric elements described in a layer representation will define the relative locations of the circuit device components that will make up a circuit device. Thus, the geometric elements in the representation of an implant layer will define the regions where doping will occur, while the geometric elements in the representation of a metal layer will define the locations in a metal layer where conductive wires used will be formed to connect the circuit devices. Typically, a designer will perform a number of analyses on the layout design. For example, the layout design may be analyzed to confirm that it accurately represents the circuit devices and their relationships described in the device design. The layout design also may be analyzed to confirm that it complies with various design requirements, such as minimum spacings between geometric elements. Still further, it may be modified to include the use of redundant or other compensatory geometric elements intended to counteract limitations in the manufacturing process, etc. After the layout design has been finalized, it then is converted into a format that can be employed by a mask or reticle writing tool to create a mask or reticle for use in a photolithographic manufacturing process.

Modern integrated circuits typically will be formed of multiple layers of material, such as metal, diffusion material, and polysilicon. During the manufacturing process, layers of material are formed sequentially on top of one another. After each layer is created, portions of the layer are removed to form various structures corresponding to the shape of the geometric elements in layout design. Together, the structures of material form the functional circuit devices, as noted. Before a new layer is formed over the structures in an existing layer, however, the existing layer must be polished to ensure planarity. Polishing using any of various types of polishing processes sometimes is referred to generically as "planarization."

One problem with conventional planarization methods is that different materials will have different densities, so softer materials will be polished more deeply than harder materials. As a result, a layer's surface may become uneven, causing the next layer to be more uneven. In some situations, the uppermost layers of material may have a very irregular surface topography. Such irregular surface topographies may cause a variety of flaws in the circuit structures, such as holes, loss of contact, and other manufacturing defects.

To improve the planarity of a layer of material, the integrated circuit designer (or manufacturer) often will analyze a circuit layout design for empty regions in the layer. That is, the designer or manufacturer will review the pattern density of the geometric elements in the design for a layer, to identify regions that are empty of geometric elements. The designer or manufacturer will then modify the circuit layout design to fill these empty regions with data representing "dummy" or "fill" geometric elements. That is, the designer or manufacturer will increase the density of geometric elements in the circuit layout design for the layer. When the circuit is manufactured, "fill" structures will be formed by the fill geometric elements alongside "functional" structures (i.e., the structures the form the components of functional circuit devices), so that the overall surface of the layer is relatively flat. This type of corrective technique will often be implemented using a software application for identifying and manipulating the geometric elements defined in a circuit layout design, such as the CALIBRE® verification and manufacturability software tools available from Mentor Graphics® Corporation of Wilsonville, Oreg.

While this corrective technique usually improves the planarity of layers in an integrated circuit, it has some drawbacks. First, a user must typically divide a layer design into multiple smaller area or "windows," and then manually identify and fill the empty regions on a window-by-window basis. This process can be very time consuming and tedious. Moreover, because the fill geometric elements are added to only a single layer at a time, this tedious process must be repeated for each layer in the design needing fill geometric elements.

Moreover, adding fill geometric elements may increase the capacitance of the layer. If the designer or manufacturer inadvertently fills too much of the empty regions in a design with fill geometric elements, or places fill geometric elements too close to functional geometric elements in the design, the resulting increased capacitance may cause the circuit devices around the fill structures to exceed their minimum timing requirements. Adding fill geometric elements that are too close to functional geometric elements also may increase the occurrence of bridging faults between the fill structures and the functional structures when the circuit is manufactured. Still further, each additional fill geometric element may increase the time and complexity of optical proximity correction processing or resolution enhancement technology processing of the circuit layout design prior to manufacture.

BRIEF SUMMARY OF THE INVENTION

Advantageously, various examples of the invention provide techniques for optimizing the pattern density in the circuit layout design of a circuit layer. According to various implementations of the invention, a layer in circuit design is analyzed to define empty regions that can be filled with fill polygons (referred to hereafter as "fill" regions). With some examples of the invention, a designer or manufacturer may specify constraints for defining the fill regions, so that fill polygons cannot inadvertently be placed too closely to functional polygons. Next, a pattern of fill polygons is generated. For some implementations of the invention, a designer or manufacturer may create a repeating pattern of a fill polygon of any desired size and shape, or even a combination of multiple fill polygons of any desired sizes and shapes. Thus, an initial polygon fill pattern may contain relatively large fill polygons, to minimize the number of fill polygons required to fill the fill regions. Subsequent iterations of the fill process may then use fill polygons of progressively smaller sizes, in order to maximize the area of the fill regions filled with fill polygons.

After the fill polygons have been defined, the layout design for the layer is divided into separate areas or "windows," and a target density for each window is determined. More particularly, each window is analyzed with respect to its adjacent windows, to determine a target density for the window that will satisfy specified density constraint values, such as a minimum density constraint, a maximum density constraint, or a maximum density gradient constraint. Various examples of the invention will attempt to determine the smallest target density for the window that will comply with each of the specified density value constraints. Thus, some examples of the invention may attempt to determine a target density that will be both greater than a specified minimum density constraint, and ensure that the density gradient between the window and its adjacent windows is less than a specified maximum density gradient. Once this target density for the window has been determined, the fill polygons required to most closely approach this target density are generated and added to the circuit layout design. With some implementations of the invention, for example, fill polygons are selected individually from the fill polygon pattern based upon a difference between the determined target window density and the current window density, as well as the area occupied by each fill polygon. The selected fill polygons are then added to the fill regions in the circuit layout design. With some examples of the invention, this process may be repeated with progressively different (e.g., smaller) fill polygons, until each window meets or exceeds both the specified minimum density and complies with the specified maximum density gradient.

Various implementations of the invention allow a user to simultaneously optimize the density of multiple layers of a circuit by designing fill structures that exist in one or more of these layers. That is, embodiments of the invention may allow a user to add geometric fill elements to multiple layers of a circuit design simultaneously. For example, a user may designate a target structure density value for a three-dimensional window in the design where the window includes a portion of two or more layers in the circuit design. The target structure density value may be a minimum density value for one or more portions within the window, or a cumulative density value for the entirety of the window. Representations of a multilayer fill structure section will then be added to the circuit design until the target density is met.

BRIEF DESCRIPTION OF THE DRAWINGS

FIGS. 9A-9H illustrate a schematic representation of the operations that may be performed on an array of windows of a circuit layout design to obtain a target density for each window according to various examples of the invention

DETAILED DESCRIPTION OF THE INVENTION

Illustrative Operating Environment

Figure 1:
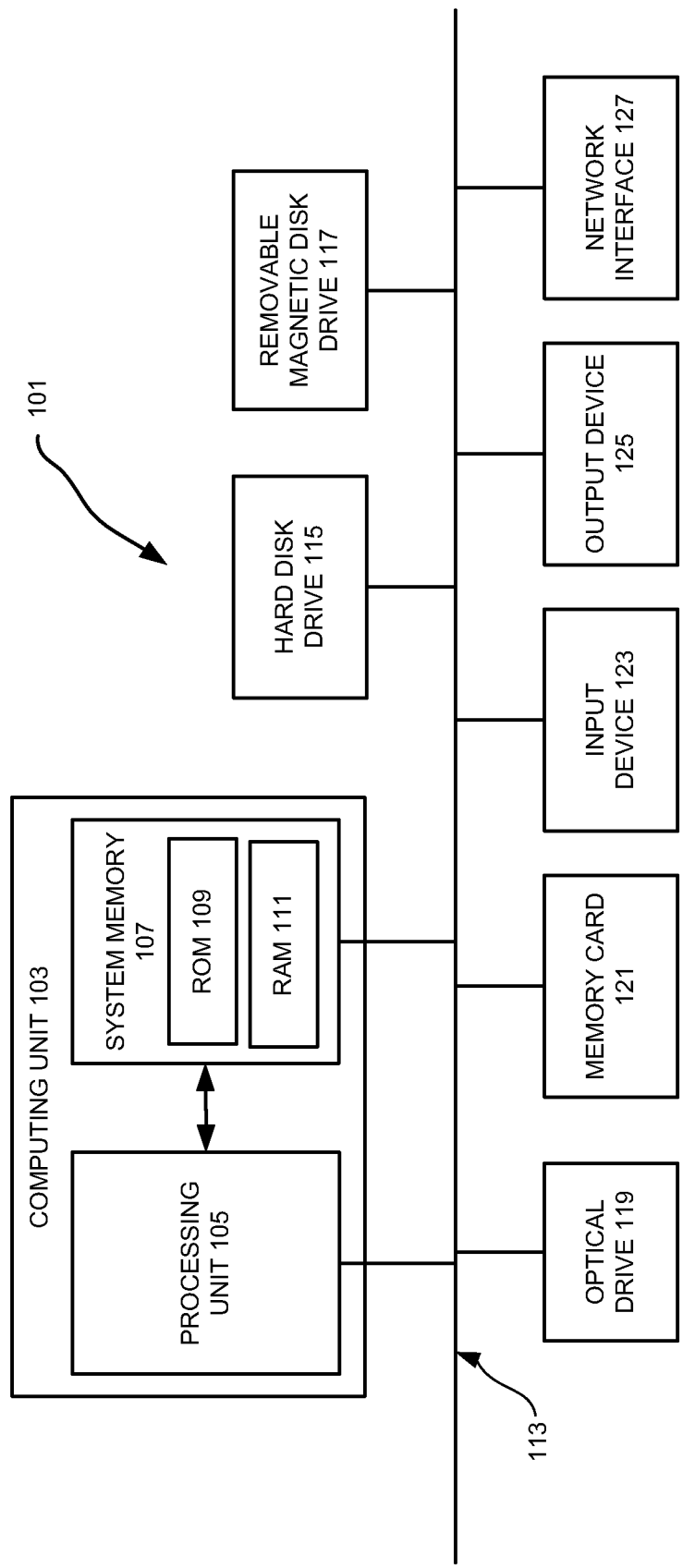
FIG. 1 illustrates an example of a computing device that may be employed to implement various examples of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, an array of single or multiprocessor computers arrayed into a network, or some combination of both.

Pattern Optimization Tool

As noted above, various embodiments of the invention may be implemented by the execution of software instructions with a programmable computer. For example, some embodiments of the invention may be implemented using the CALIBRE® verification and manufacturability software tools available from Mentor Graphics® Corporation of Wilsonville, Oreg. It should be appreciated, however, that other software tools for identifying and manipulating structures defined in a circuit layout design are known in the art, and thus may be used to implement various examples of the invention. Further, a user may employ separate software tools in combination to implement various examples of the invention. For example, a user may employ one or more software tools, such as the CALIBRE® verification and manufacturability software tools, to adjust a density of each window in a circuit layout design, and use one or more other software tools, such as proprietary software tools, to calculate the density of each window.

Figure 2:
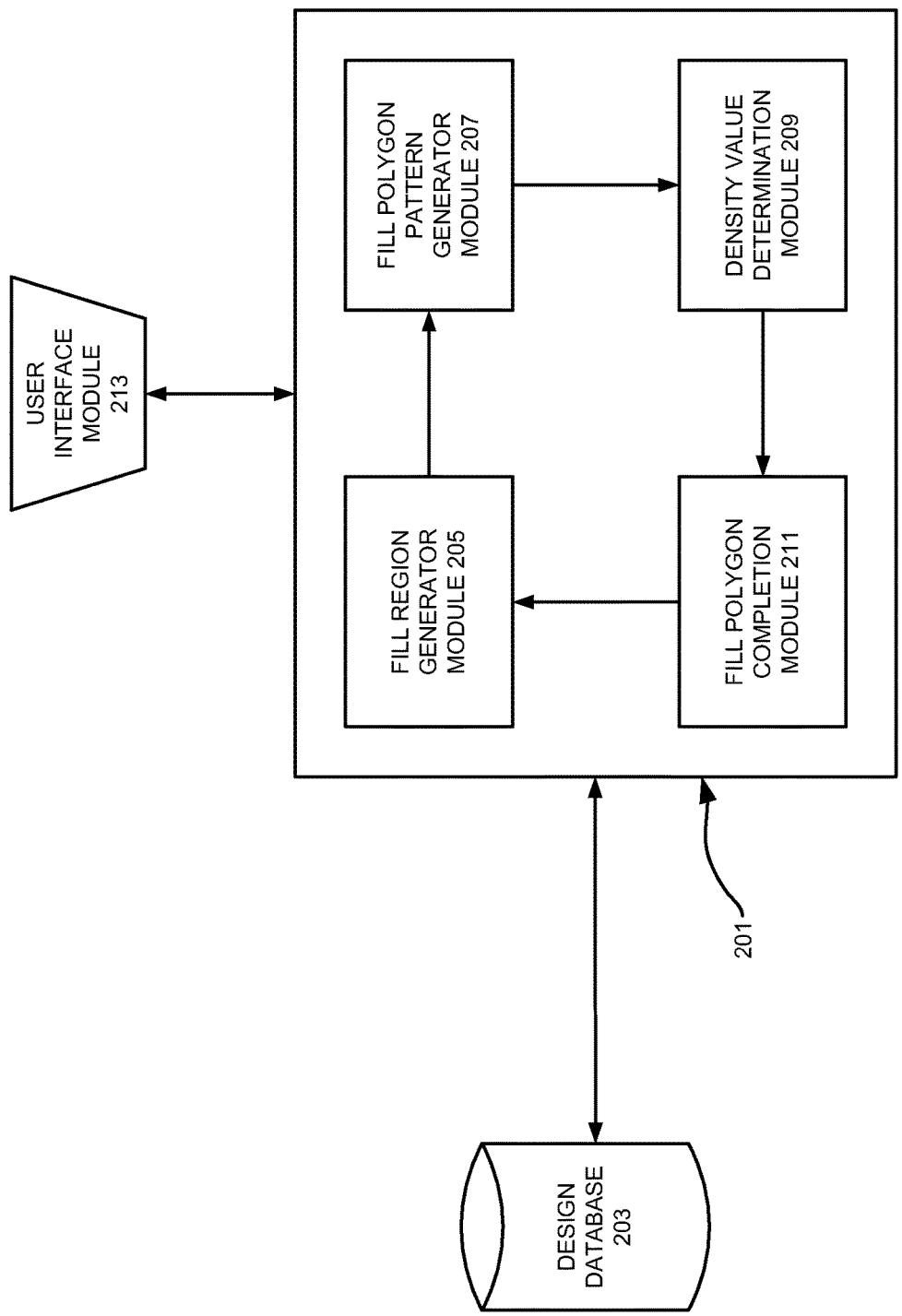
FIG. 2 illustrates a tool that can be used to optimize the pattern density of a circuit design layout according to various examples of the invention.

FIG. 2 illustrates an example of a pattern optimization tool 201 that may be employed according to various examples of the invention to optimize the pattern density of circuit layers described in a circuit design layout. With some examples of the invention, the circuit design layout data may be provided directly to the pattern optimization tool 201. Alternately, the pattern optimization tool 201 may retrieve the circuit design layout data from a design database 203. With various examples of the invention, the circuit design data may be in any desired type of data format, such as GDS-II, Oasis, Open Access, Milkyway, LEF/DEF, or Volcano. The circuit design layout data may describe an entire circuit, or it may describe only a portion of a circuit.

Figure 3A:
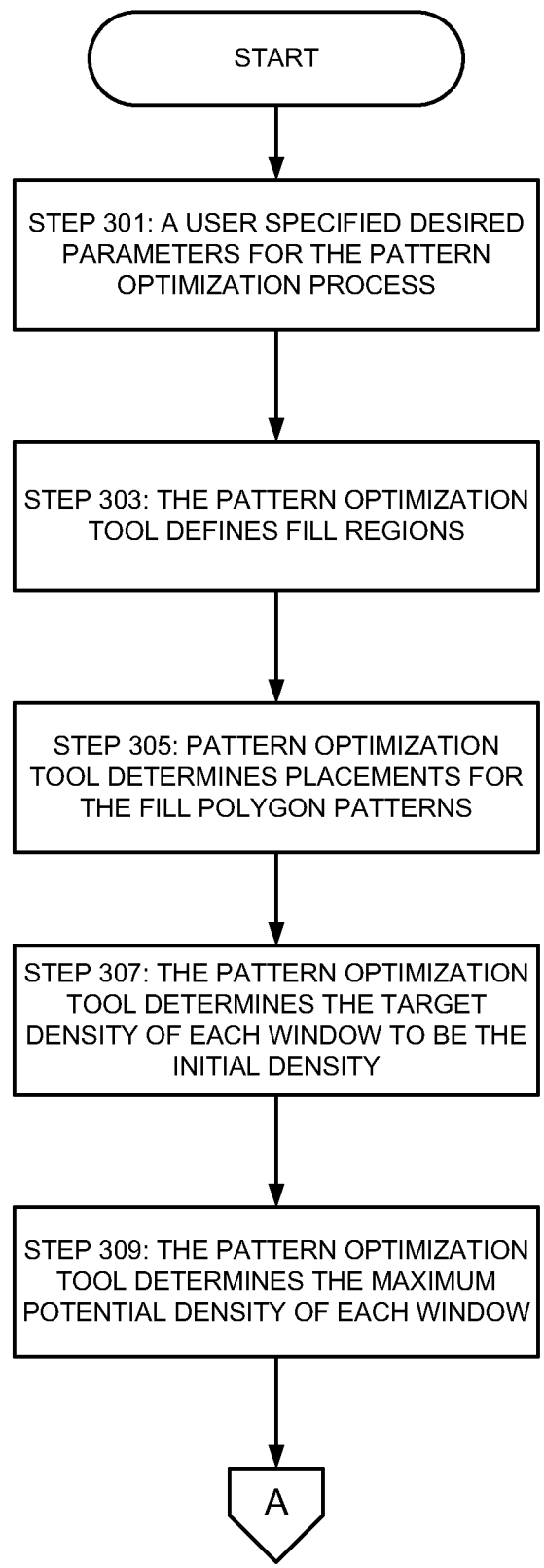
FIGS. 3A and 3B illustrate a flowchart showing the operation of the pattern optimization tool illustrated in FIG. 2.
Figure 3B:
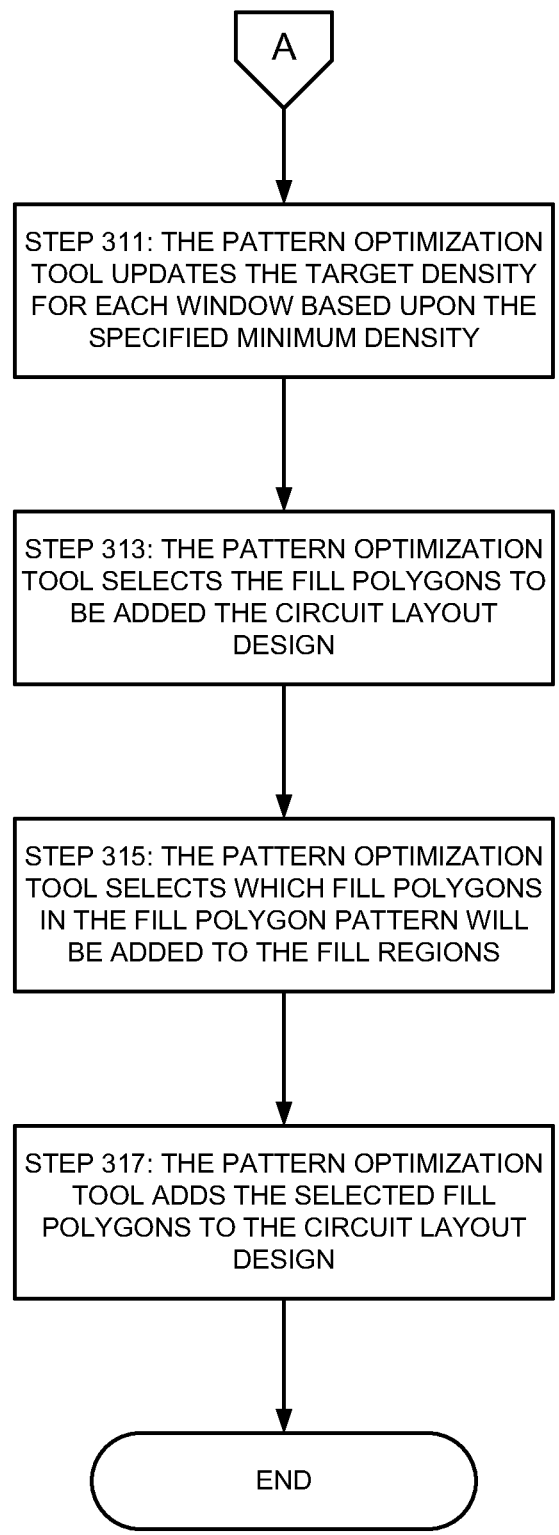

As will be discussed in more detail below, the pattern optimization tool 201 can be used to modify the circuit layout design of a layer so that one or more portions of the layer will have a density that meets one or more density constraint values. These density constraint values may include, for example, a minimum density, a maximum density, or a maximum density gradient. As seen in FIG. 2, the pattern optimization tool 201 may include a fill region generator module 205, a fill polygon pattern generator module 207, a density value determination module 209, and a fill polygon completion module 211. Some examples of the pattern optimization tool 201 also may optionally include a user interface module 213. Each of the modules 205-213 may be implemented by the execution of software instructions on a programmable computer, or, alternately, by the storage of software instructions on a computer readable medium for execution by a programmable computer. The operation of the pattern optimization tool 201 will be described with reference to the flowchart illustrated in FIGS. 3A and 3B.

Parameter Specification

Initially, in step 301, a user (such as, for example, a circuit designer, a manufacturer, or other authorized person) employs the user interface module 213 to specify desired parameters for the pattern optimization process. With various examples of the invention, the circuit layout design for a layer will be divided into smaller areas or "windows," and each window will then be modified to optimize the pattern density for that window. Accordingly, a user may initially specify the size and/or shape of the windows. A user also may specify one or more various density constraint values for each window, such as a minimum density, a maximum density, a maximum density gradient, or a combination of two or more of these density constraint values.

With some embodiments of the invention, a user may also specify various characteristics of both the fill polygons that will be added to circuit layout design, and the fill region of the circuit layout design in which the fill polygons will be added. For example, a user may specify that that the perimeter of the fill regions must be placed at some minimum distance from existing functional polygons. Further, some examples of the invention may allow a user to prohibit one or more empty areas from being designated as fill regions. A user may wish to employ this parameter to, e.g., prevent fill polygons from being added too closely to circuit devices having sensitive timing requirements. By specifying an appropriate minimum distance parameter, a user could then prohibit the area around a circuit device from being designated as a fill region, even if the area is otherwise empty of functional polygons. With various examples of the invention, this fill region designation feature may be employed even if the circuit elements are being formed on a circuit layer above or below the layer being modified (that is, this fill region designation feature may be employed on a three-dimensional basis).

A user also may specify one or more parameters for the fill polygons. For example, a user may specify any arbitrary shape for a fill polygon. A user also may specify a minimum distance between fill polygons, and whether the fill polygon will be repeated in a linear pattern or in a pattern with some type of offset. For example, with some implementations of the invention, a user may specify a set of coordinates $(x_1, y_1) \ldots (x_n, y_n)$ as the vertices of the fill polygon. If only two pairs of coordinates are specified, then the fill polygon may be assumed to be a rectangle with the first coordinate being, e.g., the lower-left corner and second coordinate being the upper-right corner. As will be discussed in more detail below, if the pattern optimization tool 201 will insert representations of a multilayer fill structure into circuit designs, the user may specify the shape and size of each section of the multilayer fill structure, how many sections the multilayer fill structure will have, and into which layers of the circuit design representations of those sections will be inserted.

Figure 4:
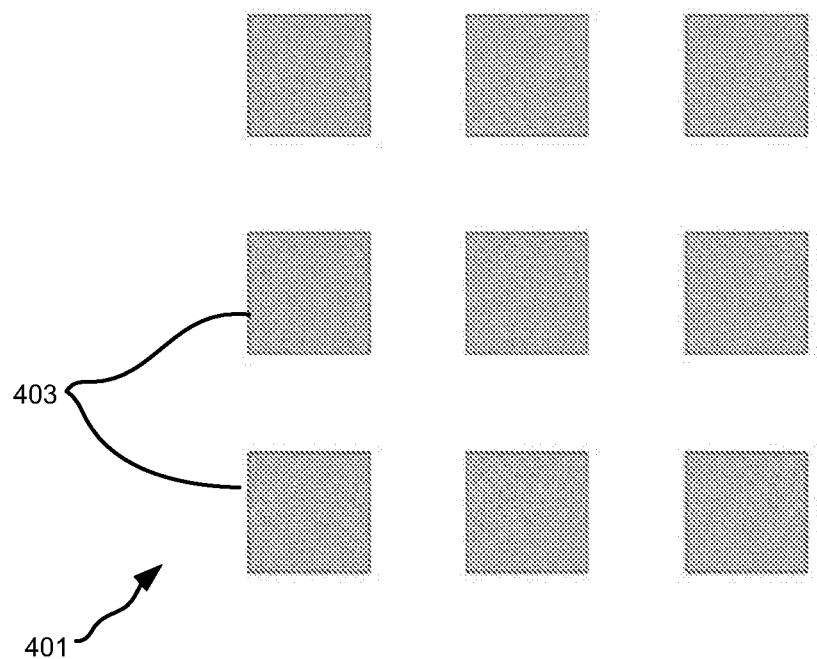
FIGS. 4 and 5 illustrate patterns of fill polygons that may be employed according to various examples of the invention.
Figure 5:
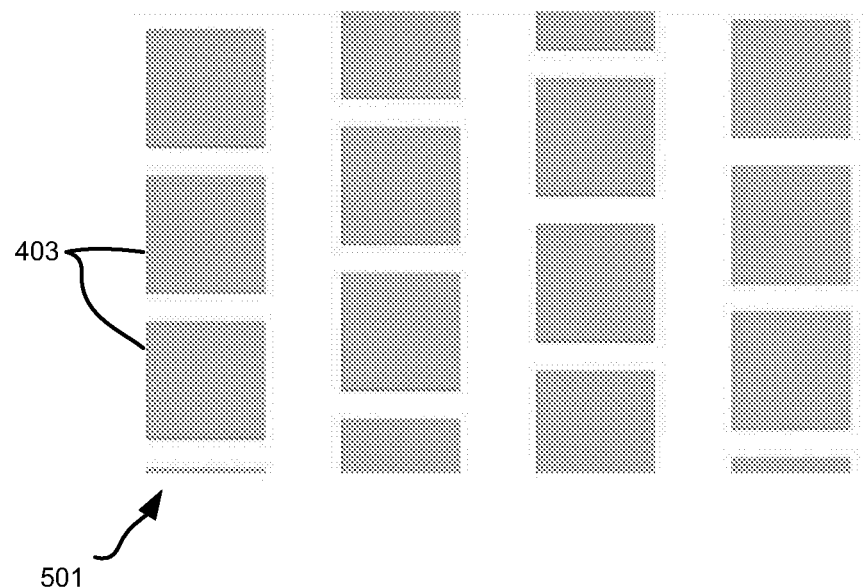

A user can then specify a "step" value as a distance between adjacent fill polygons (or representations of a multilayer fill structure) in the horizontal direction, the vertical direction, or both. A user also may specify an "offset" value as the offset (in a vertical or horizontal direction) between adjacent lines of fill polygons or representations of a multilayer fill structure. FIG. 4 illustrates a linear pattern 401 of fill polygons 403. As seen in this figure, the fill polygons will be placed in the fill regions in a regular, symmetrical pattern. FIG. 5 illustrate a pattern 501 made up of the same fill polygons 401, but with a vertical offset between each vertical line of fill polygons 401. Thus, a user may designate pattern offsets that will create horizontal lines of fill polygons, diagonal lines of fill polygons, etc.

A user also may specify a minimum distance between a fill polygon (either an individual fill polygon or a fill polygon representing a section of a multilayer fill structure) and existing objects, such as functional polygons or previously created fill polygons. For example, if a fill polygon is relatively large, a user may wish to specify a large minimum distance between occurrences of the fill polygon and functional polygons, to minimize the capacitive effects that the fill polygon may have on circuit devices in the circuit.

As will be discussed in more detail below, various examples of the invention may repeat a fill optimization process one or more times using different fill polygons or representations of a multilayer fill structure. For example, an initial iteration of a fill optimization process may be performed using a relatively large fill polygon, in order to maximize the area of the fill regions that can be filled using a minimum number of fill polygons. A subsequent iteration of this fill optimization process might then use a second, somewhat smaller fill polygon, to fill areas of the fill regions that were too small to accommodate the larger first fill polygons. Thus, various examples of the invention may add fill polygons of different shapes and sizes to a single layer. Accordingly, various examples of the invention may allow a user to specify the parameters for each different type of fill polygon that may be used in an iteration of a fill optimization process.

For example, a designer may specify a large minimum distance between a large fill polygon and existing polygon structures, to minimize the capacitive effects the fill polygon may have on circuit devices in the circuit. The user might then specify a smaller minimum distance for a smaller fill polygon, as the smaller fill polygon will inherently have less of a capacitive effect on surrounding circuit devices. A user also may specify different repeat patterns for different fill polygons. Some implementations of the invention may even allow a user to designate a minimum difference between each fill polygon and previously created fill polygons.

Defining Fill Regions

Figure 6:
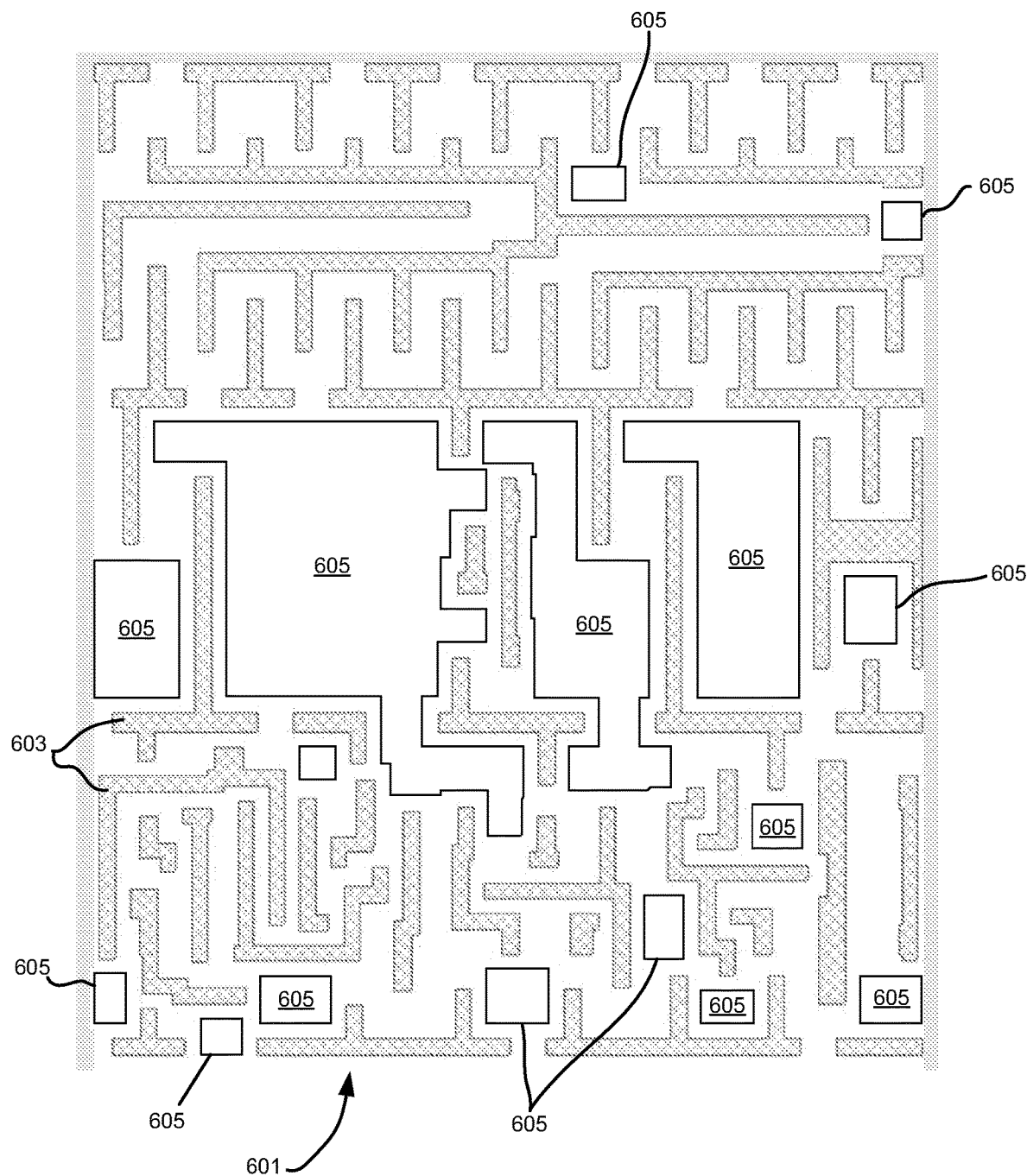
FIG. 6 illustrates a circuit layout design that defines several different functional polygons.

In step 303, the pattern optimization tool 201 defines fill regions in the circuit layout design for the layer. More particularly, the fill region generator module 205 will identify areas in the circuit layout design that are empty of existing polygon structures, such as functional polygons or existing fill polygons (such as fill polygons that were added to the circuit layout design in an earlier iteration of a fill optimization process). Based upon the specified parameters for generating fill regions discussed above, the fill region generator module 205 will then designate portions of the empty areas as fill regions. For example, FIG. 6 illustrates a circuit layout design 601 that defines several different functional polygons 603. As seen in this figure, multiple fill regions 605 have been designated in the empty areas between the functional polygons 603. Further, the borders of the fill regions 605 are offset by a fixed distance from the borders of the functional polygons 603.

Generating a Maximum Fill Pattern for the Fill Regions

In step 305, the pattern optimization tool 201 determines placements of the fill polygons in an attempt to maximize the number of fill polygons placed in the fill regions. More particularly, for each fill region 605, the fill polygon pattern generator module 207 will determine a placement for an entire pattern of fill polygons that seems to best maximize the number of fill polygons that will fit into the fill region. Similarly, if the pattern optimization tool 201 is adding representations of a multilayer fill structure, the fill polygon pattern generator module 207 may determine a placement for an entire pattern of multilayer fill structure representations that seems to best maximize the number of multilayer fill structure representations (i.e., fill polygons) that will fit into the fill regions in the multiple layers associated with the multilayer fill structure.

With some implementations of the invention, the fill polygon pattern generator module 207 may use a simple effort-based technique to determine the placement of a fill polygon pattern in a fill region. With this technique, a user specifies an "effort" parameter to describe the amount of effort that the user wishes the fill polygon pattern generator module 207 to expend in placing the fill polygon pattern. If the value of the effort parameter is greater than "1," then the fill polygon pattern generator module 207 will attempt to place the fill polygon pattern at that number of different initial offset locations in the fill region, to determine the offset location that will fill the fill region 605 with the largest number of fill polygons.

For example, if the value of the effort parameter is "5," then the fill polygon pattern generator module 207 will place the fill polygon pattern using an initial location value and four offset location values, to determine which corresponding location will fill the fill region 605 with the largest number of fill polygons. With some examples of the invention, each location value may be a single location. With still other examples of the invention, however, each location value may be the value of a single coordinate describing a location. Thus, with these embodiments of the invention, selecting an effort parameter of "5" will cause the fill polygon pattern generator module 207 to attempt to place the fill polygon pattern at 25 different actual locations (i.e., using all possible combinations of 5 different x-coordinate values and 5 different y-coordinate values).

If two or more different placement locations will fill the fill region 605 with the largest number of fill polygons, then the fill polygon pattern generator module 207 may select a placement location based that will best center the fill polygons inside of the fill regions. Of course, there are a number of placement algorithms that are well known in the art, many of which are more sophisticated than the effort technique described above. It should be appreciated that alternate embodiments of the invention may employ any desired placement algorithm to place the fill polygon pattern within the fill regions, such as linear optimization algorithms, simulated annealing algorithms, Monte Carlo algorithms and the like.

Determining a Target Window Density

As will be discussed in more detail below, the density value determination module 209 attempts to determine a target density for each window. More particularly, the density value determination module 209 attempts to determine a target density for each window that both (i) meets or exceeds the minimum density specified for the window, and (ii) ensures that the density gradient for the window is equal to or less than a maximum density gradient specified for the window.

Figure 8:
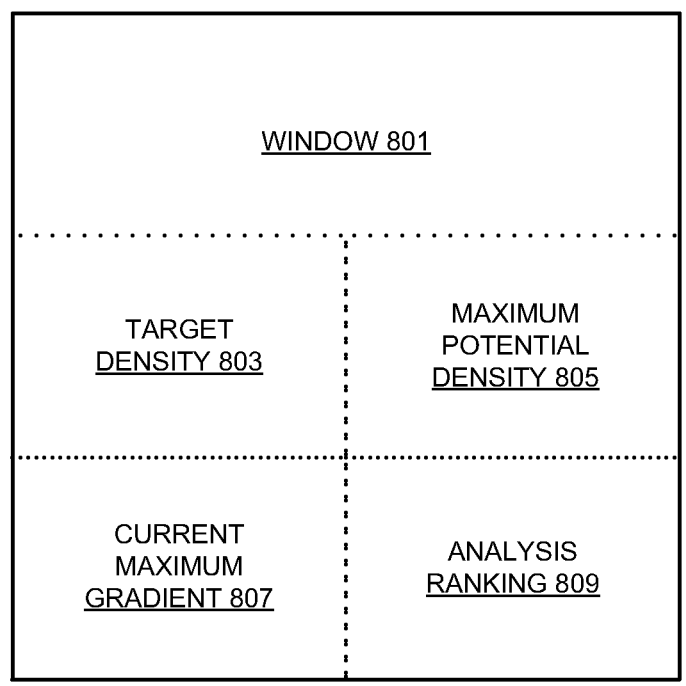
FIG. 8 illustrates a schematic representation of the properties of a window that may be employed according to various examples of the invention.

FIG. 8 illustrates a schematic representation of the properties of a window 801 that may be employed according to various examples of the invention. As seen in this figure, the window 801 will have a target density 803 assigned by the density value determination module 209. It also will have a maximum potential density 805, a current maximum density gradient 807, and an analysis ranking 809. Each of these properties, and their use by various examples of the invention, will be discussed in more detail below.

Returning now to FIG. 3, in step 307, the pattern optimization tool 201 defines the target density 803 of each window 801 to be the actual initial density of that window 801. More particularly, because the density of a window cannot normally be reduced to below its actual initial density, the density value determination module 209 first determines the target density 803 of the window to be the actual initial density of the window 801. With various examples of the invention, the density of a window may be defined as the total area of a material in a window divided by the total area of the window. Various examples of the invention, however, may allow a user to specify an alternate definition of a density value. For example, a user may wish to employ a more complicated expression of density that takes into account an analysis of adjacent layers of material, algorithms to approximate thickness of structures, etc.

By way of illustration, FIG. 9A shows a schematic representation of an array of windows 801. With this example, a user has specified that each window have a minimum density of 20%, a maximum density of 70%, and a maximum density gradient of 40%. Further, the density value determination module 209 initially defines the target density 803 for each window to be its actual density. Thus, the initial target density 803 for window 801A is 9%, the initial target density 803 for window 801B is 40%, the initial target density 803 for window 801C is 50%, etc. As seen from FIG. 9A, each of windows 801A, 801E, 801F, 801M, 801N, 801Q, 801S, 801U and 801X (identified with stippling) has an initial target density 803, i.e., an actual density, below the minimum density of 20%. In step 309, the density value determination module 209 determines the maximum potential density 805 of each window. That is, the density value determination module 209 determines what the density of the window would be if the maximum number of fill polygons 605 were added to the fill regions in (or extending into) the window. The maximum potential density 805 of each window 801 is shown in FIG. 9B.

With some examples of the invention, the density value determination module 209 may optionally also determine the additional density increase that would be obtained by the addition of each single fill polygon to the fill regions in (or extending into) the window. For example, the density value determination module 209 may determine that a window has an existing density of 60%, and thus initially define the current proposed density to be 60%. The density value determination module 209 also may determine that, if all possible fill polygons in a placed fill polygon pattern were added to the fill regions 605 in (or extending into) the window, then the window would have a density of 80%. Thus, the density value determination module 209 would define the maximum potential density to be 80%. With some examples of the invention, the density value determination module 209 may also then determine that each added fill polygon will increase the density of the window by 5%, thereby allowing the discrete potential densities of the window to be 60%, 65%, 70%, 75%, or 80%. These incremental discrete density increases may be stored, for example, in a table for any desired future use.

Of course, it should be appreciated that the fill polygon pattern may be placed so that one or more of the fill polygons may intersect a window's borders, and thus may not fit entirely within the window. Accordingly, the density value determination module 209 may also determine the fill polygon pattern position for any desired incremental density value, or alternately or additionally determine a fill polygon pattern position for a density value determination that most closely approximates a desired incremental density increase (e.g., a position that most closely approximates a 10% density increase).

In step 311, the pattern optimization tool 201 updates the target density for each window 801 based upon the specified minimum density. More particularly, the density value determination module 209 updates the target density 803 for each window 801 to be the least of (1) the specified minimum density, (2) the maximum potential density 805 of the window, or (3) the actual density of the window (i.e., the initial target density 803, so that no change is made). Thus, referring back to the example illustrated in FIG. 9C, the target density 803 for each of windows 801A, 801F, 801N, 801Q, 801S, 801U, and 801X are increased to 20%. Further, the target density 803 of window 801E is increased to its maximum potential density 805 (i.e., to 14%), while the target density 803 of window 801M is increased to its maximum potential density 805 (i.e., to 16%). Although windows 801E and 801M still do not meet the specified minimum density constraint of 20% (as shown with stippling), increasing the target densities 803 for these windows may help improve the density gradient for surrounding windows, as will be discussed below. It should be noted that the target densities 803 for the remaining windows are not changed, and remain at their actual density values.

Next, in step 313, the pattern optimization tool 201 updates the target density for each window. With some examples of the invention, a user may simply specify a target density for each window. According to some embodiments of the invention, however, a user may specify a maximum density gradient for a window, as noted above. Based upon the difference between proposed density gradient for the window 801 (using the current target density 803 for the window) and the specified maximum density gradient for the window, the density value determination module 209 will determine a new target density for each window 801 that will ensure that the maximum density gradient for the window is still less than the specified maximum density gradient constraint.

With some examples of the invention, a density gradient may be an absolute density gradient or a relative density gradient. If the density gradient is an absolute density gradient, then the density gradient is defined as a difference between densities of adjacent windows. The value is reduced by the sqrt(2) for windows that are touching at only their corners. If the density gradient is a relative density gradient, then the density gradient is defined as the difference between densities of adjacent windows divided by the largest density among the two windows. Again, this value is reduced by the sqrt(2) for windows that touch only at their corners.

FIG. 9D illustrates the current maximum gradient 807 for each of the windows 801 (determined using the current target density 803 for each window). As seen in this figure, the maximum gradient 807 for windows 801D, 801E, 801G, 801H, 801J, 801M, 801P, 801Q and 801V all exceed the maximum density gradient constraint of 40% (as shown by stippling or vertical hatching).

In order to determine a new target density 803 for each window 801, the density value determination module 209 may first determine the density value for each window 801, and then sort each window 801 from highest density to lowest density. Starting with the window having the highest density, the density value determination module 209 could then increase the densities of the adjacent windows to within a specified density difference. For example, if the highest density window has a density of 80% and the specified density difference is 10%, the target density for each window adjacent to the highest density window will be increased to 70% (or to the maximum potential density of that window, whichever is less). The density value determination module 209 would then update the densities values in processed windows before moving to the window with the next highest density, to repeat the process. The density value determination module 209 would then repeat these steps again for all windows.

For example, as shown in FIG. 9E, window 801P has a target density of 69%, so the density value determination module 209 would assign this window an analysis ranking 809 of "1." Window 801H has the next largest target density of 66%, so the density value determination module 209 would assign window 801H an analysis ranking 809 of "2." Similarly, window 801J would be assigned an analysis ranking 809 of "3," window 801D would be assigned an analysis ranking 809 of "4," window 801W would be assigned an analysis ranking 809 of "5," window 801C would be assigned an analysis ranking 809 of "6," window 801Y would be assigned an analysis ranking 809 of "7," window 801B would be assigned an analysis ranking 809 of "8," window 801R would be assigned an analysis ranking 809 of "9," window 801V would be assigned an analysis ranking 809 of "10," and so forth.

Thus, if the specified density difference is 5%, then the target density of the windows adjacent to the window 801P will first be updated. In particular, window 801K will be updated to 50% (the maximum potential density of the window), the target density of the window 801Q will be updated to 31% (the maximum potential density of the window), and the target density of the window 801U will be updated to 35% (the maximum potential density of the window. Next, the target density of the windows adjacent to the window 801H will be updated. Specifically, the target density of the window 801C will be updated to 51% (the maximum potential density of the window, the target density of the window 801I will be updated to 33% (the maximum potential density of the window), and the target density of the window 801G will be updated to 29% (the maximum potential density of the window). (It should be noted that the target density of window 801M is already at its maximum potential density.)

The target density of the windows adjacent to the window 801J then will be updated. As the target density of window 801I has already updated to its maximum potential density, and the target density of window 801E is already at its maximum potential density, then the target density of the window 801O will be updated to 40% (the maximum potential density of the window). Next, the target density of the windows adjacent to the window 801D will be updated. As each of windows 801C, 801E, and 801I is already at its maximum potential density or has been updated to its maximum potential density, however, then the target density of the windows adjacent to the window 801W will be updated. In particular, the target density of the window 801V will be updated to 39% (the maximum potential density of the window). Likewise, the target density of the window 801R will be updated to 46% (5% less than the target density of the window 801W), while the target density of the window 801X also will be updated to 46% (5% less than the target density of the window 801W).

This target density update process then will be continued for each of the windows in order of its ranking. Further, this process will be repeated until the gradient for each window that can comply with its desired maximum gradient does so (i.e., where the window is not prevented from reaching the desired maximum gradient by a low maximum potential density for that window or an adjacent window).

In the implementation described above, only windows immediately adjacent to the higher density window are updated. With various implementations of the invention, however, windows that are at the corners of the higher density window also may have their target density updated. With some implementations of the invention, the corner windows may be updated using the same specified density difference. Alternately, some implementations of the invention may update the corner windows using a reduced specified density difference. Also, with some implementations, each window may be updated multiple times during the target density update process. With still other embodiments of the invention, however, each window may only be updated once during each iteration of the target density update process.

Also, various implementations of the invention may not rank every window for a target density update process. Some circuit designs may be divided into hundreds of windows, thousands of windows, or even hundreds of thousands of windows. In order to reduce the computer processing time for executing a target density update process, various embodiments of the invention may process only a specific queue of density-ranked windows. For example, some implementations may update the target densities of adjacent windows based upon only 1000 high-density windows during each iteration of the target density update process. After each iteration of the target density update process, the highest-density window, for example, may be discarded, and the next highest density window may be added to the queue. Thus, after the first iteration of the target density update process, the highest density window may be discarded, and the 1001$^{st}$ highest density window added to the queue for the second iteration of the target density process.

Still other embodiments of the invention may determine a new target density 803 for each window 801 by having the density value determination module 209 sort the windows by ranking the windows 801 according to those that violate their maximum gradient constraints by their worst-case negative gradients (i.e., high-density windows along the edge of low density windows). Accordingly, as shown in FIG. 9F, each of the windows 801 that has a negative gradient less than −40 are assigned an analysis ranking 809. More particularly, the window 801H is assigned an analysis ranking 809 of "1." The windows 801P, 801J, and 801D are then each assigned the analysis 809 of "2," "3," and "4," respectively. Then, starting with the first window 801 in the sorted list, the density value determination module 209 will determine if the window 801 already has been analyzed. If it has, then the density value determination module 209 will skip to the next window 801 in the list.

If the window 801 has not been analyzed, then the density value determination module 209 will identify all of the windows that surround the window 801 being analyzed. If any of these surrounding windows has a lower density than the window being analyzed, the density value determination module 209 will mark that surrounding window as "unanalyzed." The density value determination module 209 then will update the target density for that window as the smallest of (1) the maximum potential density for the window, (2) the maximum density specified for the window, or (3) the minimum delta density that must be subtracted from the density of the window being analyzed to comply with the specified minimum density gradient constraint. Thus, as shown in FIG. 9G, when window 801H is analyzed, the target density 803 of adjacent window 801G is updated from 24% to 26% to thereby reduce its current maximum density gradient from 42% to 40%. The target density 803 of window 801M is not changed however, because it is already at the maximum potential density 805 for that window.

This process is then repeated for each unanalyzed window, until a new target density has been determined for each window 801 in the list. Thus, as shown in FIG. 9H, when window 801P is analyzed, the target density of adjacent window 801Q is updated from 20% to 29%, in order to thereby reduce its current maximum density gradient from 49% to 40%. The target density of adjacent window 801U likewise is updated from 20% to 29%, in order to thereby reduce its current maximum density gradient from 49% to 40% as well. It should be appreciated, however, that with various examples of the invention, the density value determination module 209 will not select a target density for a window that exceeds the maximum density for the window specified by the user. Likewise, the density value determination module 209 will not select a target density for a window that falls below the minimum density for the window specified by the user.

It also should be appreciated that alternate examples of the invention may employ other techniques for determining the minimum target density required to obtain a desired density gradient. For example, with some implementations of the invention, the density value determination module 209 may determine the local density values for each window 801. Next, the density value determination module 209 would select the window with the maximum local density as a reference window. For all windows that have a local density below a user defined threshold difference amount (e.g., less than 15%-20%) from their reference window, these windows would be filled with fill polygon to reach a target density specified by a user. For example, if a reference window has a local density of 80%, and the threshold difference amount is defined to be 20%, then all local windows having densities less than 60% would be assigned a target density of 60%. For local windows with densities of 60% or greater, their target densities would not be changed (i.e., they would remain their actual densities).

Still further, with some examples of the invention, the density value determination module 209 may determine the density difference between the window being analyzed and an adjacent window, and compare this difference with a maximum density difference constraint. If the density difference between the analyzed window and its adjacent window is a negative value that exceeds the maximum density difference constraint, then the target density of the analyzed window will be increased to the mean average of the target densities of all four adjacent windows. This process can then be repeated for each window.

Of course, alternate embodiments of the invention may employ still other techniques for updating the target density of a window to meet a specified gradient constraint. It should be appreciated that the specific techniques discussed herein are given only as examples, and are not intended to be limiting.

Selection of Fill Polygons to be Added to the Circuit Layout Design

In step 315, the pattern optimization tool 201 selects which fill polygons in the fill polygon pattern (or which multilayer fill structure representations in the pattern of multilayer fill structure representations) will be added to the fill regions 605, in order to change the actual density of the window to approach the target density determined for the window. For example, with some implementations of the invention, the fill polygon completion module 211 identifies the fill polygons that should be added to the fill regions 605 in (and extending through) the window to bring the window's density to a value that meets or slightly exceeds the target density. With various embodiments of the invention, for example, the fill polygon completion module 211 will analyze each fill polygon in the fill polygon patterns placed within a window. For each fill polygon, the fill polygon completion module 211 will determine whether the fill polygon will be added based upon the probability of adding each fill polygon in the fill polygon pattern based upon the difference between the target density for the window and the window's actual current density, and the area occupied by each fill polygon. The results of the probability determination will decide whether an individual fill polygon will be added to or omitted from the fill regions 605.

For example, in order to increase the density of a window from its current actual density to its determined target density, the fill polygon completion module 211 may need to select 80% of the achievable fill polygons in the window. Accordingly, for each fill polygon, the fill polygon completion module 211 may generate a number between 0.0 and 1.0 using a random number generator. If the random number generated for the fill polygon is 0.80 or less, then the polygon will be selected. If the random number generated for the fill polygon is greater than 0.80, then the fill polygon completion module 211 will not select the fill polygon.

Alternately, some examples of the invention may calculate a selection value for each achievable fill polygon in a window based upon the number of fill polygons that already have been selected. For example, with an achievable number n of fill polygons for a window (i.e., fill polygons $701_1$, $701_2$, $701_3$ ... $701_n$) and a numbers of fill polygons that already have been selected, the probability p of adding the a polygon is:

$p=s/n.$

Thus, for the first fill polygon, s=0 and n=1, so the probability p=0 (i.e., ≤0.8). The first fill polygon will be selected. For the second fill polygon, s=1 and n=2, so the probability p=0.5 (i.e., ≤0.8). The second fill polygon also will be selected. For the third fill polygon, s=2 and n=3, so the probability p=0.666 (i.e., ≤0.8). The third fill polygon thus will be selected as well. For the fourth fill polygon, s=3 and n=4, so the probability p=0.75 (i.e., ≤0.8). The fourth fill polygon also will be selected. For the fifth fill polygon, s=4 and n=5, so the probability p=0.8 (i.e., ≤0.8). The fifth fill polygon will be selected. For the sixth fill polygon, however, s=5 and n=6, so the probability p=0.833 (i.e., >0.8). Accordingly, the sixth fill polygon will not be selected.

Of course, still other techniques may be implemented to select which fill polygons will be added to the circuit layout design to increase the actual density of a window to approach the determined target density of the window. For example, some implementations of the invention may alternately or additionally favor the selection of fill polygons that are more distant from functional polygons, and/or disfavor the selection of fill polygons that are closer to functional polygons.

Figure 7:
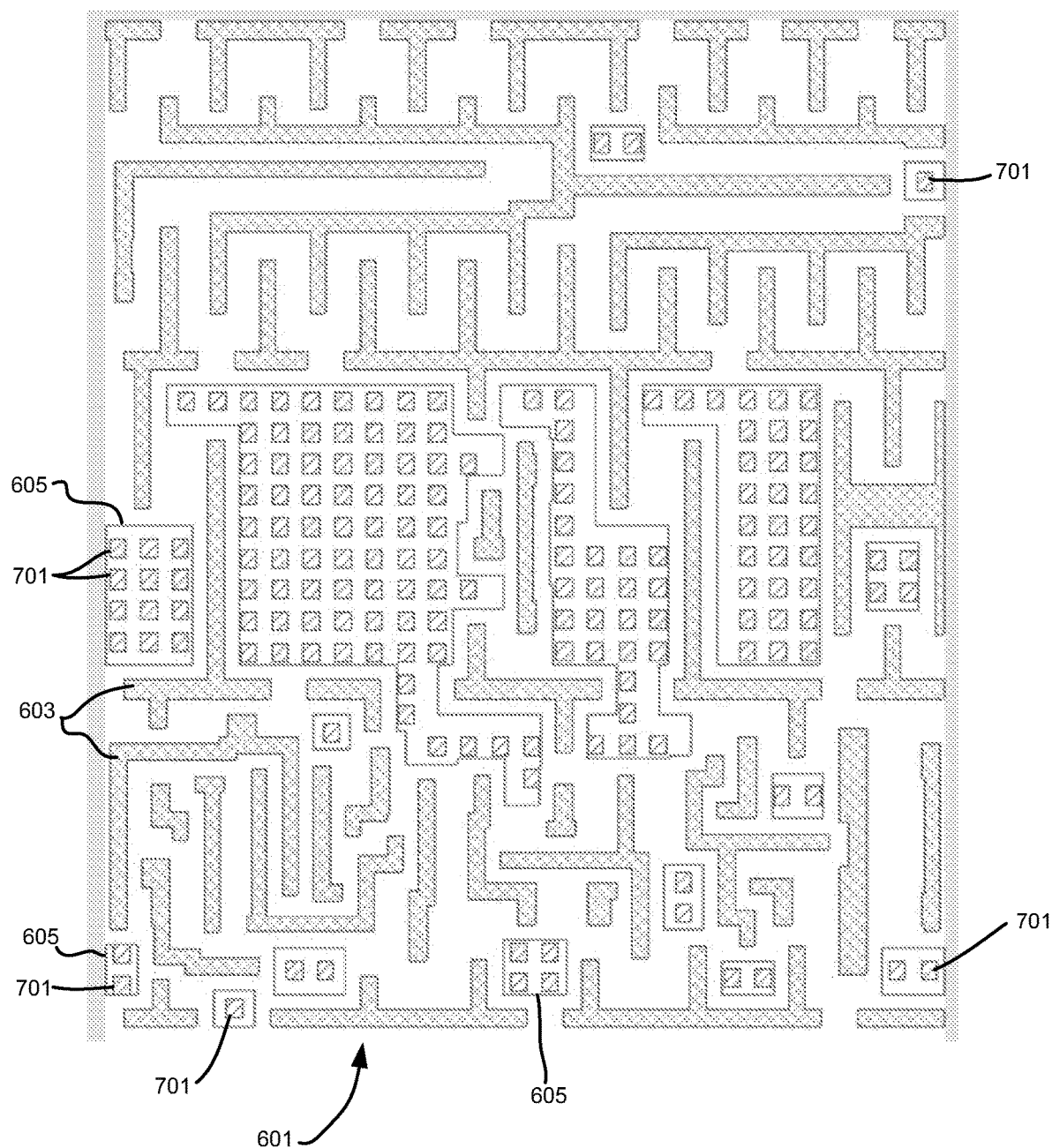
FIG. 7 illustrates an example of the addition of the maximum number fill polygons to a circuit layout design according to various examples of the invention.
Figure 10:
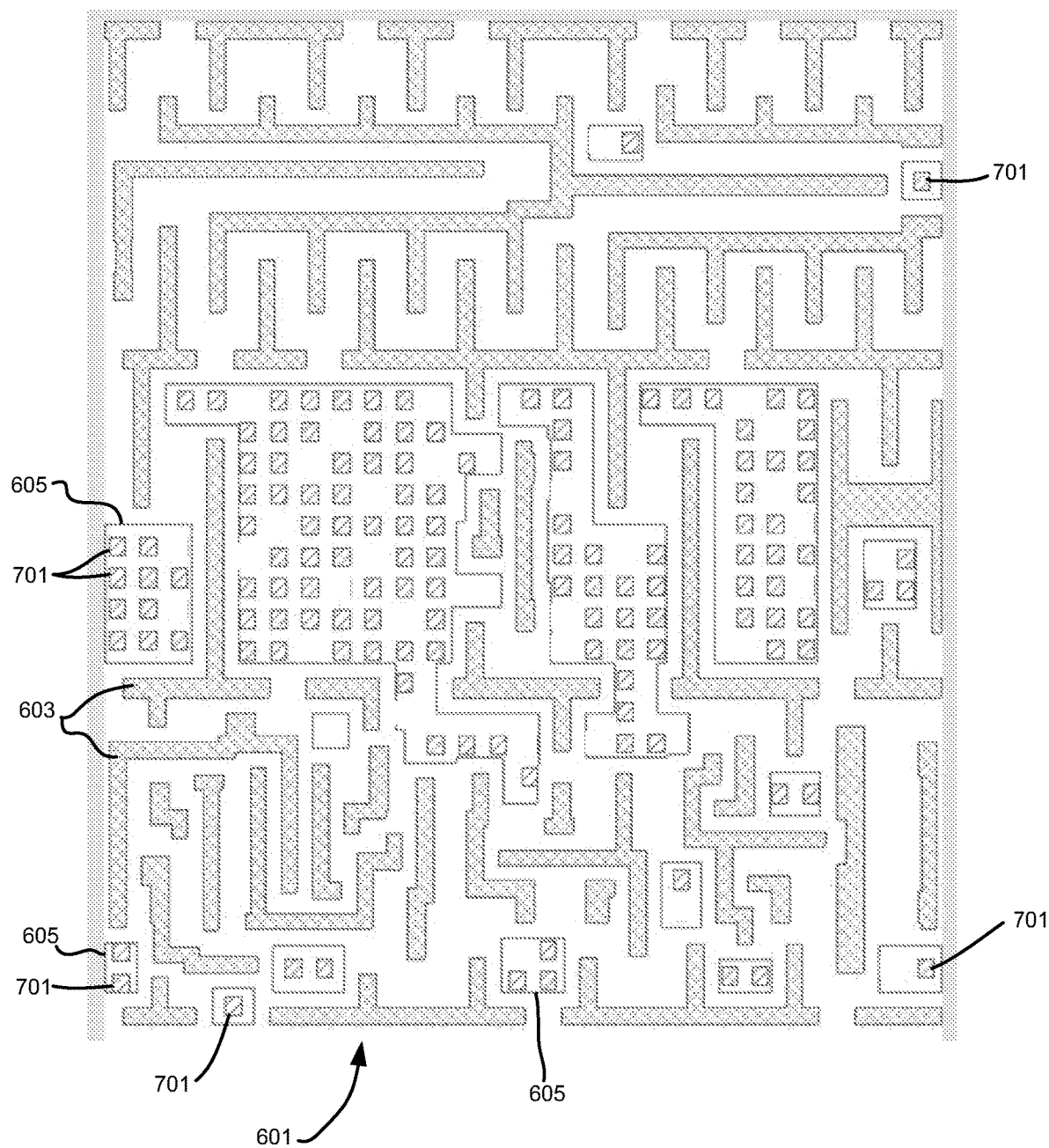
FIG. 10 illustrates an example of the addition of a selected number fill polygons to a circuit layout design according to various examples of the invention

Once each of the fill polygons have been analyzed, the fill polygons (or the multilayer fill structure representations) that will be added to the fill regions 605 are written to the circuit layout design in step 317. For example, FIG. 10 shows the addition of selected fill polygons 607 to the fill regions 605 in the circuit layout 601 illustrated in FIG. 7. As seen in this figure, only a portion of the achievable polygons 701 shown in FIG. 7 actually are written to the circuit layout design.

Multiple Iterations of the Optimization Process

Figure 11:
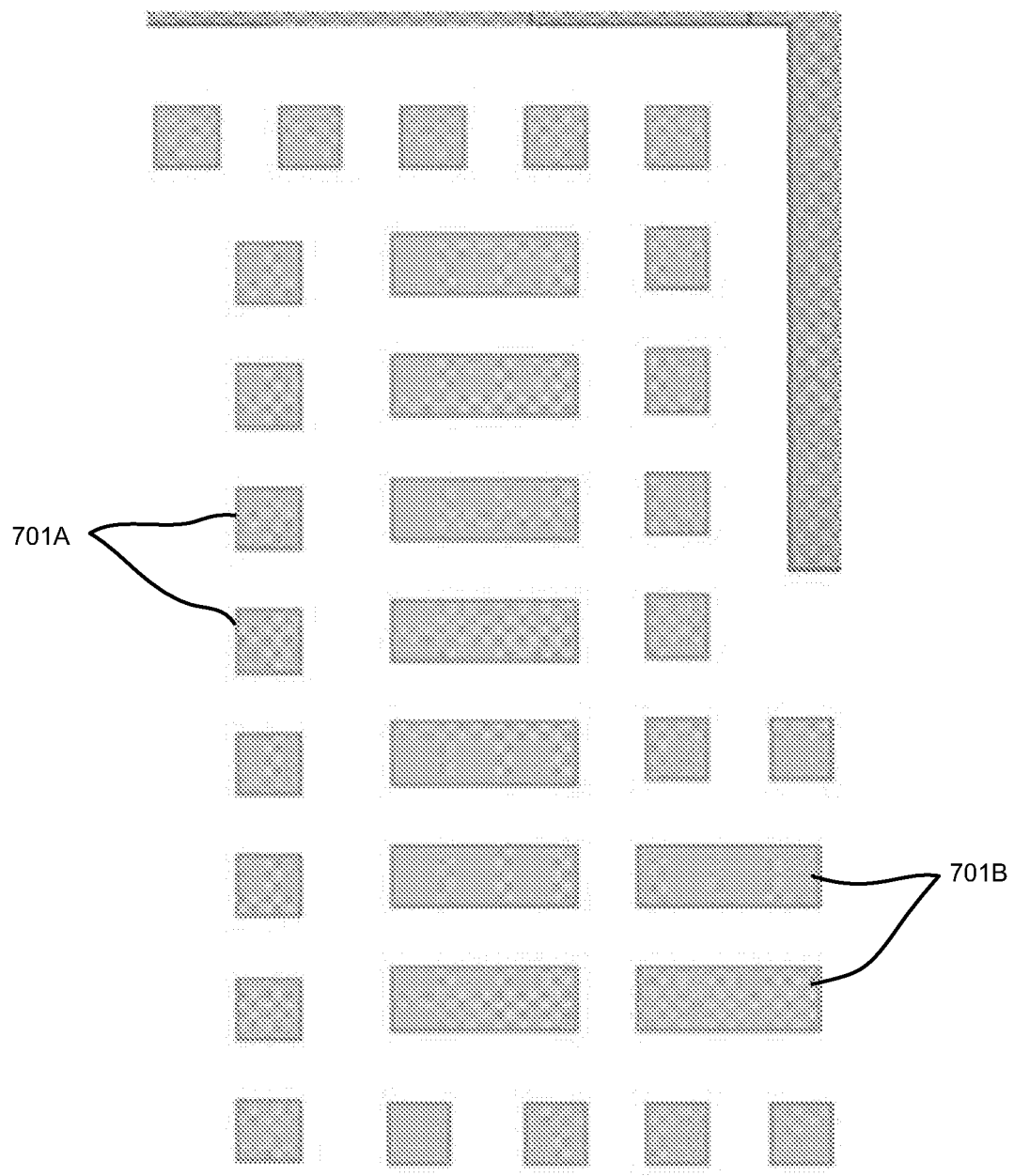
FIG. 11 illustrates the use of differently-sized fill polygons according to various examples of the invention.

As previously noted, steps 303-315 may be repeated multiple times for fill polygons or multilayer fill structure representations of different shapes and sizes. In this manner, for example, progressively smaller fill polygons 701 may be added to the circuit layout design, until each window complies with its specified target density values or until no further fill polygons 701 can be added to the window. As a result, a fill region in a layer may contain fill polygons 701 of multiple sized and shapes, as illustrated in FIG. 11.

After the fill polygons 701 (or representations of multilayer fill structures) have been written to the circuit layout design, the modified circuit layout design may be stored in the design database 203. Thus, the design database 203 may store each corrective design change as alternate data for the circuit design data.

Once all of the selected corrective design changes have been incorporated into the circuit design data, then the circuit design data may be output for use in manufacturing the circuit. The circuit design data may be output in any desired format, such as such as GDS-II, Oasis, Open Access, Milkyway, LEF/DEF, or Volcano.

Slotting

As discussed in detail above, various examples of the invention can be used to increase the pattern density of one or more portions of a layer in a circuit layout design. Other embodiments of the invention, however, may be used to decrease the density of one or more portions of a layer in a circuit layout design. With these embodiments, the fill polygons are used to form slots in the layer material, rather than raised structures.

Depending upon the intended functionality of a circuit, the circuit layout design for the circuit may have relatively large areas of material. For example, a metal layer in a circuit may include a very large structure serving as a ground plane. While this structure may need to have a large width or length to carry the required amount of current, its size might also create undesired capacitive effects on surrounding circuit devices. Accordingly, it might be desirable to break up the pattern density of this structure by creating holes or "slots" at various locations over the area of the structure. In this manner, the pattern density of the structure can be reduced to where its capacitive effects on surrounding circuit elements are decreased to an acceptable level. It is important, however, that the slots not be formed in locations that would reduce the operation of the structure, such as at a narrow area that connects two larger areas.

Accordingly, with various examples of the invention, a user may specify some or all of a large structure as a fill region. As discussed in detail above, the user may then generate a pattern of fill polygons for that fill region. For slotting, however, the target density will be the density of the slots to be formed in a structure. For example, if a user wishes to reduce the density of a structure to 30%, then the user can configure the invention to generate a target density of 70%. In this manner, some embodiments of the invention may be used to reduce a density gradient by reducing the density of a high-density region, rather than increasing the density of a low-density region.

Multi-Layer Fill Generation

For some manufacturing processes, such as processes involving aluminum, density optimization of a single layer typically is sufficient. For more complicated manufacturing processes, however, such as manufacturing processes involving copper, the polishing effects on lower layers are translated to higher layers in a cumulative fashion. Accordingly, with these manufacturing processes, it is more useful to optimize the structure density of multiple layers of the device. Moreover, during a process that involves polishing copper, both the oxide material and the copper are simultaneously polished. This may create mechanical stress issues that, in addition to thickness issues, also encourage optimizing the structure density of multiple layers of the device.

Further, when copper or aluminum fill structures with a relatively small footprint area are used (such as relatively small squares of copper or aluminum), these smaller fill structures have a tendency to get scraped off in the polishing process. Thus, in addition to optimizing the density of multiple layers of a device, it also is often desirable to anchor fill structures in a lower layer of a device to fill structures in one or more upper layers of a device by forming a single fill structure that extends through multiple layers of an integrated circuit device.

Various implementations of the invention advantageously allow a user to simultaneously optimize the density of multiple layers of a circuit by designing fill structures that exist in one or more of these layers. More particularly, some implementations of the invention may allow a user to designate a target structure density constraint for each portion of a layer falling within a designated three-dimensional window. For example, a single three-dimensional window may overlap a 10 μm×10 μm area of a first metal layer (e.g., metal1 layer), a corresponding 10 μm×10 μm area of a second metal layer (e.g., metal2 layer), and a corresponding 10 μm×10 μm area of a third metal layer (e.g., metal4 layer). The user may then specify a different target structure density for each metal layer portion within the window. Thus, a user may specify that the first metal layer portion have a minimum structure density of 25%, the second metal layer portion have a minimum structure density of 10%, and the third metal layer portion have a minimum structure density of 25%. As will be discussed in more detail below, various implementations of the invention may alternately or additionally allow a user to specify a cumulative or average density for all of the layers associated with the multi-layer fill structure.

During the density optimization process, various implementations of the invention will add representations of one or more multilayer fill structures to each of the metal layers in a design until at least one of the density constraints are met. For example, the pattern optimization tool may attempt to simultaneously place representations of each section of a multilayer fill structure (i.e., a fill geometric element) in a layout design at corresponding positions in each of the metal layers. Various embodiments of the invention may employ, for example, any of the techniques described above for placing fill geometric elements within the fill areas of each layers of a circuit design specified by a three-dimensional window.

With a "minimum" fill process, the pattern optimization tool will continue to place representations of a section of a multilayer fill structure within each designated metal layer of the window until at least one of the density constraints (i.e., a density constraint for at least one of the layers in the design) are met. Thus, if the original density of the first metal layer portion was 12%, the original density of the second metal layer portion was 3%, and the original density of the third metal layer portion was 15%, then a representation of a section of a multilayer fill structure might be simultaneously added to each of the metal layer portions until the density of the first metal layer portion within the three-dimensional window is increased to 19%, the density of the second metal layer portion within the three-dimensional window is increased to its constraint value of 10%, and the density of the third metal layer portion within the three-dimensional window is increased to 22%.

With some implementations of the "minimum" fill process, once the constraint for one of the metal layers is met, then the fill process for that three-dimensional window is stopped, and a design data in a new window is processed. For still other implementations of the "minimum" fill process, however, portions of the remaining layers of the design within the three-dimensional window may continue to be filled until, for example, the fill density of each layer portion within the three-dimensional window meets or exceeds its specified minimum density constraint. With some implementations of the invention, each remaining layer may continue to be filled on an individual basis, using one or more individual fill geometric element, according to, for example, any of the techniques as described in detail above. With still other examples of the invention, however, the remaining layer portions of the design within the three-dimensional window may be filled using representations of a smaller multilayer fill structure.

That is, various implementations of the invention may simultaneously continue to fill each layer portion within the three-dimensional window by adding representations of a multilayer fill structure that omit a section corresponding to the previously-filled layer. For example, once the density of portion of the second metal layer is filled to meet the minimum constraint value of 10%, the pattern optimization tool may continue to simultaneously fill the portions of the first and third metal layers by adding representations of a multilayer fill structure that includes a section corresponding to the first metal layer (i.e., a fill geometric element for the first metal layer) and a section corresponding to the second metal layer (i.e., a fill geometric element for the third metal layer), but which omits a section corresponding to the second metal layer.

The new representation of the smaller multilayer fill structure may be similar to the previous representation of a multilayer fill structure (differing only, for example, in the omitted section corresponding to the previously-filled layer). Alternately, the new representation of a multilayer fill structure may be significantly different from the previous representation of a multilayer fill structure. According to various implementations of the invention, as each layer portion of the design within the three-dimensional window is filled to meet its specified minimum constraint density, representations of a smaller multilayer fill structure subsequently can be added to fill the remaining layer portions in the window. In this manner, the remaining layers in the three-dimensional can be simultaneously filled until only a single layer portion within the three-dimensional window remains below its specified minimum density constraint. This remaining layer portion can then be filled using individual fill geometric elements according to, for example, any of the fill techniques described in detail above.

Various implementations of the invention may alternately or additionally employ a "maximum" fill process. With this process, representations of a multilayer fill structure are added to each metal layer portion until the constraint for each portion is reached. Thus, with the above example, representations of one or more multilayer fill structures may be added to each metal layer portion until the density of the first metal layer portion is increased to 32%, the density of the second metal layer portion is increased to 13%, and the density of the third metal layer portion is increased to its constraint value of 25%.

As well as allowing a user to designate a constraint for each individual layer portion within a window, some implementations of the invention may alternately or additionally allow a user to designate a cumulative density constraint value for all of the layers. For example, if 10 layer portions each have been assigned a minimum density constraint of 15%, and the constraint value is met or exceeded for each of these layer portions, then the cumulative density for the window may be too much (i.e., overfill). With these embodiments of the invention, a user can instead assign a lower minimum density for each individual layer portion, and then assign a desired maximum cumulative density value for all of the layer portions to ensure against undesired overfill during a subsequent manufacturing process.

Various implementations of the invention may further provide an "equalize" operation that causes fill structures to be applied as equally as possible between multiple layers in a design. For example, because the thickness of a layer portion after polishing is a non-linear function of its density, the equalize operation may first determine what the average thickness should be for each layer portion in order to comply with the cumulative density value for the window. More particularly, if the cumulative constraint value is x, and the window has m number of metal layer portions, then the equalize operation may determine that each metal layer portion should have a thickness of x/m, and further determine a density associated with that thickness.

If one or more layer portions has a thickness (or corresponding density) that exceeds this average value, then the equalize operation will then determine how much additional thickness (or corresponding density) should be provided by the remaining layer portions to reach the designated cumulative constraint value. Finally, the equalize operation will attempt to divide the required density between the remaining layer portions. With some embodiments of the invention, the equalize operation will attempt to divide the required density between the remaining layer portions equally. With still other embodiments of the invention, the equalize operation will attempt to divide the required density between the remaining layer portions so that the remaining layer portions each have an approximately equal thickness after polishing.

Still other implementations of the invention may alternately or additionally provide a simpler "cumulative" operation that inserts one or more multilayer fill structures into a design based upon the cumulative density for the layers associated with the multilayer fill structure. For example, a designer may determine that the total fill density for three layers must be 80%. If the first layer has a density of only 20%, then the cumulative operation will determine that the density of the remaining two layers together should have a density of 60%. This operation allows the tool to compensate for layers that may be limited to a relatively small pattern density (to, e.g., reduce capacitance) by increasing the pattern density of the other layers, to ensure that the surface of the uppermost layer is relatively planar.

It should be appreciated that various implementations of the invention may iteratively employ representations of differently-sized multilayer fill structures to fill a layer portion of a design to a desired fill density, as described in detail above with respect to single-layer fill processes. For example, some implementations of the invention can add representations of a first multilayer fill structure having a relatively large footprint. If, for example, the pattern optimization tool determines that no additional representations can be added to the layer portions of the design, but that a minimum (or maximum) fill requirement still has not been met, then the tool may begin adding representations of a smaller multilayer fill structure to the layer portions. These steps can be repeated for consecutively smaller multilayer fill structures until the specified fill requirements are met.

Figure 12A:
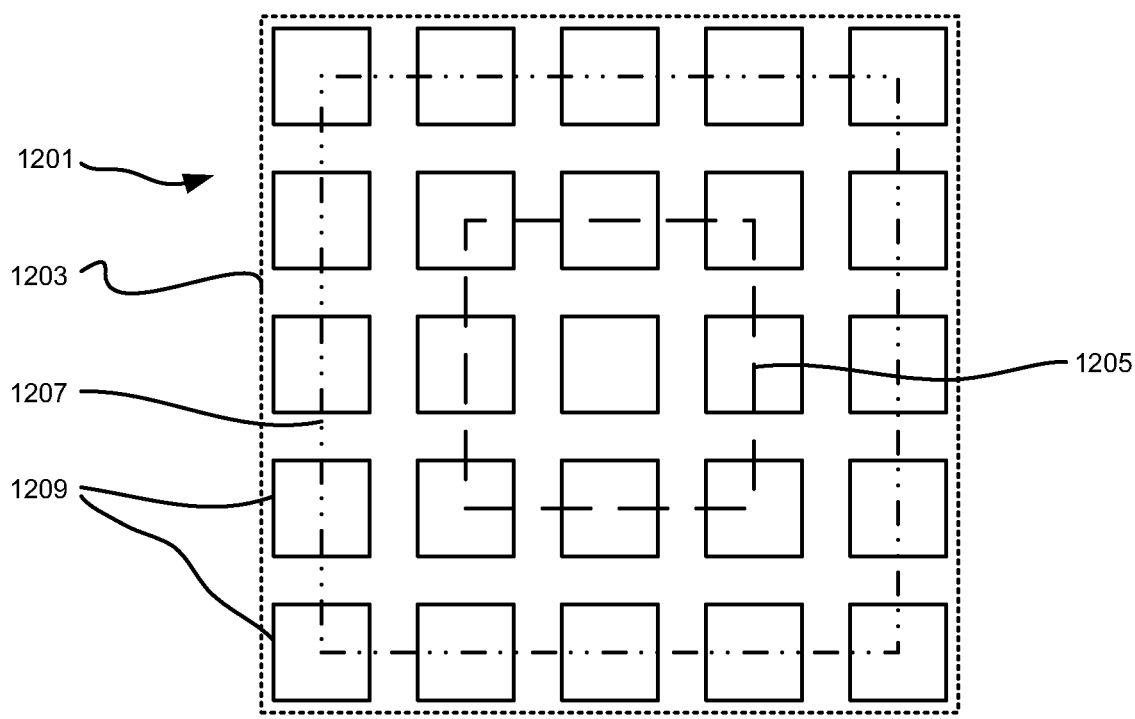
FIGS. 12A and 12B illustrate examples of representations of multi-layer fill structures.

It also should be appreciated that various implementations of the invention may employ representations of multilayer fill structures having any desired shape. Further, the size and shape of a multilayer fill structure may be different for each layer. One such representation 1201 is illustrated in FIG. 12A. As seen in this figure, the footprint 1203 of one section (shown with a beaded line) for the multilayer fill structure 1201 is a relatively large square for one layer. That is, the multilayer fill structure 1201 will have a relatively large, square geometric element to be added to the design of the circuit layer corresponding to that section. The footprints 1205 (shown with a dashed line) and 1207 (shown with an alternating beaded and dashed line) of other sections then are smaller squares, while the footprint 1209 of still another section of the multilayer fill structure 1201 is made up of a set of small, separate squares.

Figure 12B:
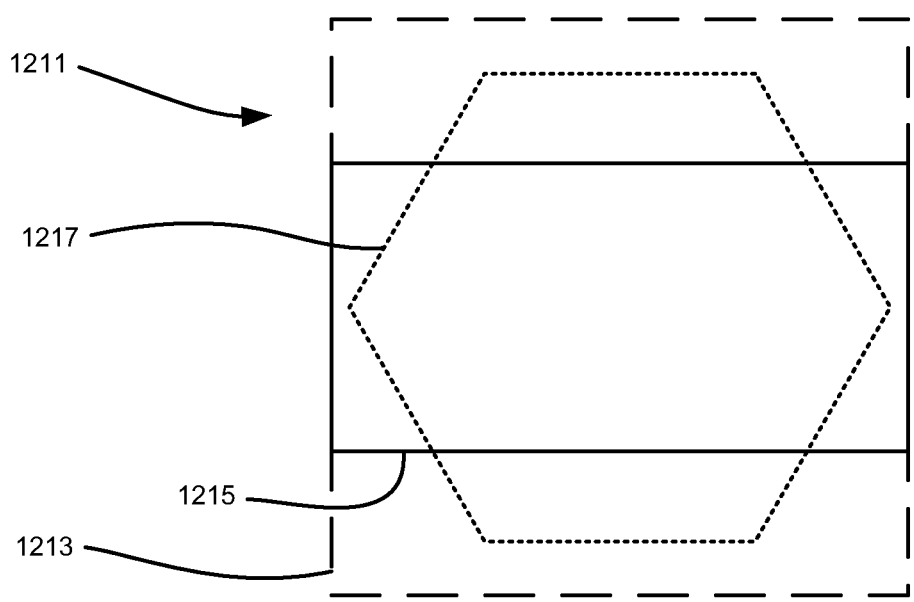

As shown in FIG. 12B, the representation of a multilayer fill structure may have differently shaped footprints for different layers. As seen in this figure, the representation 1211 has a square footprint 1213 (shown in a dashed line) for one section of a multilayer fill structure, a rectangular footprint 1215 (shown in a solid line) for another section of the multilayer fill structure, and a hexagonal footprint 1217 (shown in a beaded line) for still another section of the multilayer fill structure.

Some embodiments of the invention may further allow a user to define one or more of the multilayer fill structures, or one or more sections of a single multilayer fill structure. Still further, some implementations of the invention may optionally expand the footprint area of a multilayer fill structure in a layer to maximize its coverage of the available fill area in that layer. Also, some examples of the invention may employ representations of multilayer fill structures with discontinuous sections. For example, pattern optimization tool according to some embodiments of the invention may employ a representation of a multilayer fill structure having a first section for insertion into a first metal layer, a second section for insertion into a second metal layer, and a third section for insertion into a third metal layer. It may be, however, that the metal layers are separated by an intervening layer, such as a layer of resistive material. The representation of the multilayer fill structure can still be used to simultaneously add a fill geometric element to fill regions in the design for each layer.

It also should be appreciated that, with various implementations of the invention, each of the layers in a multilayer fill structure may have a different placement constraint. For example, the placement constraints (e.g., design rules) for a first metal layer may prohibit a polygonal layout shape from being positioned within 5 microns of another shape. On the other hand, the placement constraints for a second metal layer may only prohibit a polygonal layout shape from being positioned within 2 microns of another shape. With various implementations of the invention, the pattern optimization tool may omit portions of the fill structures for one or more layers from a multilayer fill structure if the placements of those fill structure portions in their associated layers would violate the placement constraints for those layers. Still other implementations of the invention may instead revise the size and/or shape of those fill structure portions to ensure that placements of those fill structure portions in their associated layers would not violate the placement constraints for those layers. Still further, some implementations of the invention may revise the size and/or shape of all of the fill structure portions in the multilayer fill structure, to ensure that the placement of the multilayer fill structure will comply with the placement constraints for all of the associated layers in the design.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while a specific order of steps has been described above with regard to various examples of the invention, it should be appreciated that alternate embodiments of the invention may perform one or more of these steps in an alternate order, perform one or more of these steps in parallel, or omit one or more of these steps altogether.

What is claimed is:

1. A system comprising:
a fill generator module that generates one or more fill regions for a circuit layout design;
a fill pattern generator module that generates a pattern of representations of a multilayer fill structure to be inserted into a circuit layer design, such that representations of a first section of the multilayer fill structure are inserted into generated fill regions in a first layer of the circuit layout design and representations of a second section of the multilayer fill structure are inserted into generated fill regions in a second layer of the circuit layout design;
a density value determination module that determines a target density for a window of the circuit layout design, the window including a first portion in the first layer of the circuit layout design and a second portion in the second layer of the circuit layout design; and
a fill completion module that selects representations of the multilayer fill structure from the pattern that will be added to the circuit layout design, so as to change a current density for the window to approach the determined target density.

2. The system recited in claim 1, wherein the density value determination module determines the target density to be a minimum density value for the first portion or the second portion.

3. The system recited in claim 1, wherein the density value determination module determines the target density to be a specified cumulative minimum density value for an entirety of the window.

4. The system recited in claim 1, wherein the fill polygon pattern generator generates a pattern for each of a plurality of representations of different multilayer fill structures.

5. The system recited in claim 4, wherein two or more of the different multilayer fill structures differ in size.

6. The system recited in claim 4, wherein two or more of the different multilayer fill structures differ in shape.

7. The system recited in claim 6, wherein two or more of the different multilayer fill structures differ in size.

8. A non-transitory machine-readable medium storing instructions that, when executed by a processor, cause a system to:
generate a first fill region in a first layer of a circuit layout design;
generate a second fill region in a second layer of the circuit layout design, the second layer being different than the first layer;
generate a pattern of representations of a multilayer fill structure, the representations including:
a representation of a first section of the multilayer fill structure to be inserted into the first fill region; and
a representation of a second section of the multilayer fill structure to be inserted into the second fill region;
determine a target density for a window of the circuit layout design, the window including a first portion in the first layer of the circuit layout design and a second portion in the second layer of the circuit layout design;
select representations of the multilayer fill structure from the pattern to be added to the circuit layout design, for changing a density for the window to approach the determined target density; and
add the selected representations of the multilayer fill structure to the circuit layout design.

9. The non-transitory machine-readable medium of claim 8, wherein the instructions, when executed, further cause the system to determine the target density as a specified minimum density value for the first portion or the second portion.

10. The non-transitory machine-readable medium of claim 8, wherein the instructions, when executed, further cause the system to determine the target density as a specified cumulative minimum density value for an entirety of the window.

11. The non-transitory machine-readable medium of claim 8, wherein the instructions, when executed, further cause the system to generate a respective pattern for each of a plurality of representations of different multilayer fill structures.

12. The non-transitory machine-readable medium of claim 8, wherein the instructions, when executed, further cause the system to attempt to locate the generated pattern in the circuit layout design so that a maximum area of representations of sections of the multilayer fill structure will fit into the identified fill regions.

13. A method comprising:
by a computing system:
generating a first fill region in a first layer of a circuit layout design;
generating a second fill region in a second layer of the circuit layout design, the second layer being different than the first layer;
generating a pattern of representations of a multilayer fill structure, the representations including:
a representation of a first section of the multilayer fill structure to be inserted into the first fill region; and
a representation of a second section of the multilayer fill structure to be inserted into the second fill region;
determining a target density for a window of the circuit layout design, the window including a first portion in the first layer of the circuit layout design and a second portion in the second layer of the circuit layout design;

selecting representations of the multilayer fill structure from the pattern to be added to the circuit layout design, for changing a density for the window to approach the determined target density, wherein the selecting is based on the difference between the density for the window and the determined target density; and adding the selected representations of the multilayer fill structure to the circuit layout design.

14. The method recited in claim 13, further comprising determining the target density is a specified minimum density value for the first portion or the second portion.

15. The method recited in claim 13, further comprising determining the target density is a specified cumulative minimum density value for an entirety of the window.

16. The method recited in claim 13, further comprising repeating the generating the first fill region, generating the second fill region, generating the pattern of representations, determining the target density, selecting the representations, and adding the selected representations for each of a plurality of representations of different multilayer fill structures.

17. The method recited in claim 16, wherein two or more of the different multilayer fill structures differ in area.

18. The method recited in claim 16, wherein two or more of the different multilayer fill structures differ in shape.

19. The method recited in claim 18, wherein two or more of the different multilayer fill structures differ in area.

20. The method recited in claim 13, further comprising attempting to locate the generated pattern in the circuit layout design so that a maximum area of representations of sections of the multilayer fill structure will fit into the identified fill regions.

* * * * *